United States Patent
Cameron et al.

(10) Patent No.: US 7,634,480 B2
(45) Date of Patent: Dec. 15, 2009

(54) DECLARATIVE RULES FOR METADIRECTORY

(75) Inventors: Kim Cameron, Bellevue, WA (US); Max L. Benson, Redmond, WA (US); James H. Booth, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 10/435,113

(22) Filed: May 8, 2003

(65) Prior Publication Data

US 2004/0225680 A1    Nov. 11, 2004

(51) Int. Cl.
*G06F 17/00* (2006.01)
*G06F 17/30* (2006.01)
*G06F 12/00* (2006.01)

(52) U.S. Cl. ............... 707/100; 707/104.1; 707/200
(58) Field of Classification Search ............... 707/104.1, 707/100
See application file for complete search history.

(56) References Cited

U.S. PATENT DOCUMENTS

| | | | |
|---|---|---|---|
| 4,648,036 A | | 3/1987 | Gallant |
| 4,999,766 A | | 3/1991 | Peters et al. |
| 5,838,923 A | | 11/1998 | Lee et al. |
| 5,862,323 A | * | 1/1999 | Blakley et al. ................ 726/13 |
| 5,884,328 A | | 3/1999 | Mosher, Jr. |
| 5,893,116 A | | 4/1999 | Simmonds et al. |
| 6,067,551 A | * | 5/2000 | Brown et al. ................ 707/203 |
| 6,105,062 A | | 8/2000 | Andrews et al. |
| 6,185,574 B1 | | 2/2001 | Howard et al. |
| 6,202,085 B1 | * | 3/2001 | Benson et al. ............... 709/205 |
| 6,269,406 B1 | | 7/2001 | Dutcher et al. |
| 6,343,287 B1 | | 1/2002 | Kumar et al. |
| 6,370,541 B1 | * | 4/2002 | Chou et al. ............... 707/103 X |
| 6,381,734 B1 | | 4/2002 | Golde et al. |
| 6,487,558 B1 | | 11/2002 | Hitchcock |
| 6,496,837 B1 | | 12/2002 | Howard et al. |
| 6,523,042 B2 | | 2/2003 | Milleker et al. |
| 6,523,046 B2 | | 2/2003 | Liu et al. |
| 6,542,515 B1 | | 4/2003 | Kumar et al. |
| 6,581,074 B1 | | 6/2003 | Wong et al. |
| 6,618,732 B1 | | 9/2003 | White et al. |
| 6,651,047 B1 | | 11/2003 | Weschler, Jr. |
| 6,757,720 B1 | | 6/2004 | Weschler, Jr. |
| 6,823,336 B1 | | 11/2004 | Srinivasan et al. |
| 6,834,286 B2 | | 12/2004 | Srinivasan et al. |
| 6,859,217 B2 | * | 2/2005 | Robertson et al. ........... 715/853 |

(Continued)

OTHER PUBLICATIONS

Steen et. al. "Integrating ABB Aspect Directory with Microsoft Active Directory". Thesis Paper, The Department of Comptuer Science and Electronics. Malardalens Hogeskola University, 2001. pp. 1-72.*

(Continued)

*Primary Examiner*—John R. Cottingham
*Assistant Examiner*—Michael Pham
(74) *Attorney, Agent, or Firm*—Lee & Hayes, PLLC

(57) ABSTRACT

Exemplary methods, devices, systems, and/or storage media for organizational data management, including staging, synchronizing, and exporting of organizational data. Exemplary data aggregation rules specify methods for aggregating data from a remote repository. Schemas are exemplary rules configuration data structures having elements for associating processing data objects in a buffer space objects in a core space. The elements may also specify importing attributes into and exporting attributes from the core space.

11 Claims, 7 Drawing Sheets

U.S. PATENT DOCUMENTS

| | | | |
|---|---|---|---|
| 6,912,520 | B2 | 6/2005 | Hankin et al. |
| 6,961,734 | B2 | 11/2005 | Kauffman |
| 6,973,466 | B2 | 12/2005 | Kaler et al. |
| 6,983,227 | B1 | 1/2006 | Thalhammer-Reyero |
| 6,990,513 | B2 | 1/2006 | Belfiore et al. |
| 7,310,650 | B1 | 12/2007 | Felsted et al. |
| 7,315,826 | B1 | 1/2008 | Guheen et al. |
| 2001/0034733 | A1 | 10/2001 | Prompt et al. |
| 2001/0044805 | A1 | 11/2001 | Multer et al. |
| 2001/0051948 | A1 | 12/2001 | Srinivasan et al. |
| 2002/0030703 | A1* | 3/2002 | Robertson et al. ........... 345/853 |
| 2002/0059425 | A1* | 5/2002 | Belfiore et al. .............. 709/226 |
| 2002/0156792 | A1 | 10/2002 | Gombocz et al. |
| 2003/0101194 | A1 | 5/2003 | Rys et al. |
| 2003/0105654 | A1* | 6/2003 | MacLeod et al. ................ 705/7 |
| 2003/0131025 | A1* | 7/2003 | Zondervan et al. .......... 707/200 |
| 2003/0135517 | A1 | 7/2003 | Kauffman |
| 2003/0140210 | A1 | 7/2003 | Testardi |
| 2003/0145003 | A1 | 7/2003 | Yellepeddy et al. |
| 2003/0163438 | A1* | 8/2003 | Barnett et al. ................... 707/1 |
| 2003/0208490 | A1 | 11/2003 | Larrea et al. |
| 2003/0236865 | A1 | 12/2003 | Anthe et al. |
| 2004/0064502 | A1 | 4/2004 | Yellepeddy et al. |
| 2004/0122844 | A1* | 6/2004 | Malloy et al. ............... 707/102 |
| 2004/0230559 | A1 | 11/2004 | Newman et al. |
| 2004/0249828 | A1 | 12/2004 | Childress et al. |
| 2005/0188367 | A1 | 8/2005 | Oberholtzer |

OTHER PUBLICATIONS

Robertson, George; Cameron, Kim; Czerwinski, Mary; Robbins, Daniel; "Polyarchy Visualization: Visualizing Multiple Intersectin Hierarchies"; CHI 2002, April 20-25; 8 pages; Minneapolis, Minnesota, USA.

Steen et al. "Integrating ABB Aspect Directory with Microsoft Active Directory", Thesis Paper, The Department of Computer Science and Electronics, Malardalens Hogeskola University, 2001, pp. 44-58.

Steen et al., Master Thesis in Computer Engineering; Integrating ABB Aspect Directory with Microsoft Active Directory; 76 pages.

Zhou, "Directory Integration and the Metadirectory", 1999, pp. 1-12.

McCauley, et al, "Nets Users Guide", retrieved Aug. 21, 2008 at <<http://web.archive.org/web/20020224144453/http://www.open.com.au/nets/user.html>> Revision 2.2, Feb. 24, 2002, pp. 1-83.

Meta-Directory: Architecture Module, "Monitoring", retrieved on Aug. 14, 2009 at <<http://www.ite.edu.sg/~itewebms/MetaDir_WBT/management/logs.html>>, 2000, 5 pgs.

MetaConnect Technical Overview, Nov. 1999, pp. 1-12.

Sheresh, "Understanding Directory Services", Systems Research Corporation, Edition 2, 2001, pp. 436, 445, 447, 448, 451, 453, and 454.

* cited by examiner

DECLARATIVE RULES FOR METADIRECTORY

CROSS-REFERENCE TO RELATED APPLICATION

The present application is related to co-pending U.S. patent application Ser. No. 10/434,726, entitled "Relational Directory," by Kim Cameron, Max L. Benson, Matthias Leibmann, Mark Brown, and James Booth; U.S. patent application Ser. No. 10/434,725, entitled "Attribute Value Selection for Entity Objects," by Kim Cameron, Max L. Benson, Matthias Leibmann, Edward H. Wayt, Kevin Miller and James Booth; U.S. patent application Ser. No. 10/435,720, entitled "Associating and Using Information in a Metadirectory," by Max L. Benson; U.S. patent application Ser. No. 10/435,712, entitled "Preview Mode," by Kim Cameron, Max L. Benson, Derek Murman, Edward H. Wayt, Jeffrey Bisset, Jie Liu, and Jing Wu; U.S. patent application Ser. No. 10/435,708, entitled "Rules Customization and Related Methods," by Kim Cameron, Matthias Leibmann, Max L. Benson, Jing Wu, Michael Jerger, Edward H. Wayt, and Kenneth Mark; U.S. patent application Ser. No. 10/434,411, entitled "Automated Information Management and Related Methods," by Stephen Siu, Max L. Benson, and James Booth, all of which are filed concurrently herewith, assigned to the assignee of the present application, and incorporated herein by reference for all that they teach and disclose.

TECHNICAL FIELD

The described subject matter relates generally to methods, devices, systems, and rules for storing and/or processing information.

BACKGROUND

Companies and other organizations typically maintain information about many different aspects of the organization in order to ensure efficient operation. This organizational information (or organizational data) describes people, resources, applications, and the like, which make up the organization. For example, organizational information descriptive of an employee may include his/her name, job title, salary, telephone number, and/or internet protocol (IP) address. Organizational information describing an application may include the application's name and associated services provided by the application. Organizational information describing a resource may describe the resource as a network device (e.g., a printer), the name of the device, and capabilities provided by the network device. Many other types of organizational information may be maintained.

The organizational information is typically maintained in a number of remote data storage repositories, such as databases, directories, text files, and others. For example, the human resources (HR) department may have a data repository of all employees in the company, with employee information. The information technology (IT) department may have a data repository of all email accounts and internet protocol (IP) addresses associated with employees, applications, resources, etc. Data in the repositories frequently overlaps, meaning that some information may be common among more than one repository. In a typical organization, each of the data repositories is independently maintained by the department that owns the repository. For example, the HR department maintains its own employee information, while the IT department maintains its own network information.

Because each of the various remote data repositories is independently maintained by the department that owns the data repository, and there may be data common among them, inconsistencies may arise among the data repositories. For example, the HR department repository may have employee "John Smith", and may list an email address of "johns@company.com"; the IT department may initially have John Smith's email address as "johns@company.com", but may change the address to "johns@company.com" when another employee, "John Simpson", joined the company. Thus, when the IT department changes John Smith's email address in the IT repository, the email address is no longer consistent with John Smith's email address in the HR department repository. For many other reasons, information stored in data repositories may become inconsistent within an organization. Thus, organizations typically attempt to manage their various data repositories so as to keep the information in them consistent, as well as up-to-date, accurate, and readily available.

In theory, in order to efficiently and effectively manage organizational data, the various remote data repositories could be replaced with one large repository, modifiable by the various organizational departments; however, this solution is very impractical for a few reasons. Firstly, in practice, political boundaries associated with departments in a typical organization make this solution impractical because departments typically want to control their own data. Secondly, departments are typically modeled on a division of labor model wherein each department has expertise only with regard to the information with which the department is concerned. Thus, it is impractical to have, for example, the HR department updating IP address and email address information in one large repository.

As a result, traditional systems for managing an organization's data repositories and their associated organizational information involve linking the multiple remote repositories, while allowing the each department to independently modify its own repository. One such system is a metadirectory, which is a directory of directories or repositories. In traditional metadirectories, data from each of a number of repositories is received by an associated interface that negotiates between the remote repository and a central repository. The central repository includes data representing a combination of data in all the remote repositories. Each of the interfaces typically executes scripts in response to specified events, such as the hiring/firing of an employee, or the changing of an IP or email address.

Traditionally, the scripts of one metadirectory interface were developed/changed on a per-interface basis; i.e., each metadirectory interface was developed/updated independently from the other metadirectory interfaces. Different programmers may develop/update the various interfaces and may not be aware of how other programmers are developing/updating other interfaces to take in the same data types. Even if the same programmer develops or updates all the metadirectory interfaces, the programmer may forget or lose track of how the same data types are formatted from one interface to the other. Thus, interfaces to the metadirectory do not necessarily act consistently with each other when bringing in data. For example, a metadirectory interface to the HR repository may format employee name data in the form: <last name>, <first name>, <middle initial>; while the metadirectory interface to the IT repository may format employee name data in the form: <first name>, <last name>. As such, when a metadirectory interface is developed and/or updated obliviously to other metadirectory interfaces, data in the central repository can become redundant, inconsistent, or otherwise erroneous, with regard to data format, naming, syntax and the like.

SUMMARY

Exemplary methods, systems, architectures and/or storage media for organizational data management are described.

An exemplary system includes a synchronization engine applying declarative rules to data received from a data repository. The exemplary system may include storage comprising a buffer space and a core space. Data in the core space is associated with data in the buffer space according to the data aggregation rules.

An exemplary method includes applying data aggregation rules to data received from a data repository. The exemplary method may include storing the repository data in a buffer. The exemplary method may further include storing repository data in a portion of the buffer associated with the repository data. The method may further include connecting a buffer object with a core object.

Exemplary declarative rules stored on a computer-readable medium may include a repository element specifying object types from an associated data repository, a projection element specifying criteria for projecting a data object into a core space, and/or a join element specifying criteria for joining an object in a buffer space with an object in the core space.

Additional features and advantages of the various exemplary methods, devices, systems, architectures and/or storage media will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
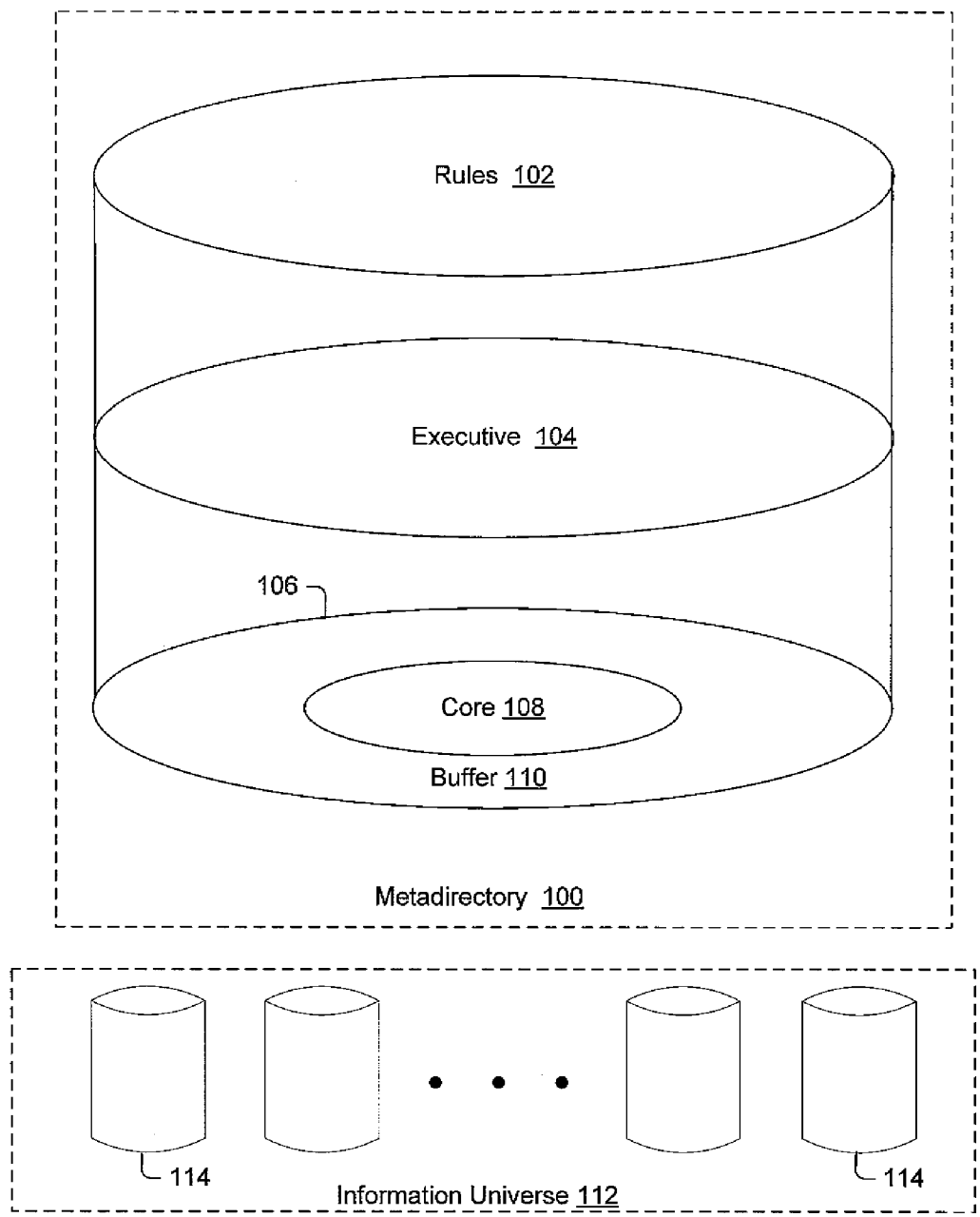
FIG. 1 is a block diagram illustrating an exemplary multilayer architecture for use in a metadirectory scenario.

Turning to the drawings, wherein like reference numerals refer to like elements, various methods are illustrated as being implemented in a suitable computing environment. Although not required, various exemplary methods will be described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including handheld devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Overview

Various technologies are described herein that pertain generally to management of organizational information. Various exemplary methods, units and/or systems optionally include, and/or operate in conjunction with, an architecture that supports local and/or global interoperability. For example, an exemplary architecture may accommodate objectives such as fault tolerance, performance, scalability and flexibility for use in organizational information acquisition, deployment and/or maintenance environments. In this example, the architecture has one or more layers, such as, but not limited to, a rules layer, an executive layer, and/or a storage layer.

In a multilayer architecture, while a fully partitioned data model is possible (e.g., ISO/OSI Network Model), strengths implicit in one layer are optionally exploited to mitigate weaknesses of another layer. For example, functions and/or methods in an exemplary architecture optionally overlap between layers to provide a greater degree of flexibility and redundancy from both an implementation and operation perspective. In such an overlapping architecture, various layers may operate to provide data storage at the executive layer, and/or the rules layer.

In general, a rules layer includes policies, schemas, data mapping, data translation, and/or other functionality. Such policies, schemas, data mapping, data translation, and/or functionality are optionally provided in a computing environment having units and/or components that rely on one or more platforms and/or operating systems. In a typical computing environment, or system, such units and/or components optionally operate autonomously, synchronously and/or asynchronously.

An exemplary executive layer optionally performs information import, export, retrieval, processing, mapping, and/or synchronization management services. For example, an executive layer may provide for receiving organizational information and projecting the information into the storage layer according to mapping policies in the rules layer. An executive layer optionally includes APIs and/or other interfaces to access hardware and/or software functionality. For example, an exemplary executive layer specifies one or more APIs that expose functionality and allow for any degree of local and/or global interoperability. Such interoperability may allow for management and/or workflow integration across one or more computing environments. For example, an executive layer may provide organizational information management services or central repository management services that allow for data reconciliation and/or access to one or more computing environments (e.g., client environments, data repositories, etc.).

An exemplary storage layer includes a buffer storage area and a core storage area. The core storage area may be viewed as an aggregated combination of organizational information from a number of data repositories. The core storage area may also be viewed as a metadirectory having referencing remote data or directories. The buffer storage area may be used as a staging area, wherein organizational data is received from one or more data repositories and processed before affecting a change in the core storage area. In general, a control and/or messaging layer can include any type of data storage components as may be known in the art, including, but not limited to, disk drives, RAID systems, optical storage media, network server, in one or more computing environments, in a platform independent manner.

Thus, as described herein, various exemplary units are suitable for use in a multilayered architecture. For example, to operate in conjunction with an executive layer, an exemplary unit may include APIs to expose hardware and/or software functionality beyond the unit (e.g., to one or more other computing environments). An exemplary unit may also communicate synchronized organizational information via operation of one or more layers. Further, an exemplary unit optionally serves as the core of a metadirectory. In general, an exemplary system may include an internal multilayer architecture that supports interoperability of internal units and/or components; an exemplary unit may also operate in conjunction with and/or support a multilayer architecture that extends beyond the system as well.

Various aspects of agility, extensibility, compatibility and/or interoperability optionally allow for preservation of existing platforms and processes. For example, exemplary methods, units and/or architectures optionally allow for streamlining organizational data management, archival, and synchronization in a heterogeneous data storage environment. In addition, implementation of such methods, units and/or architectures does not necessarily force a disruption of traditional processes (i.e., optionally preserves traditional acquisition, processing, transmission and/or other processes).

By optionally adhering to emerging standards for organizational data, data transport protocols, data formats, metadata and event management, various technologies described herein can readily accommodate legacy, current and emerging components anywhere in an organizational data storage system. While such an approach has numerous advantages at first implementation, other significant advantages may be realized over the extended life of the business needs served.

Various exemplary methods, devices, systems, and/or storage media are described with reference to front-end, intermediate, back-end, and/or front-to-back processes and/or systems. While specific examples of commercially available hardware, software and/or media are often given throughout the description below in presenting front-end, intermediate, back-end and/or front-to-back processes and/or systems, the exemplary methods, devices, systems and/or storage media, are not limited to such commercially available items.

Exemplary Architecture

Referring to FIG. 1, three layers of an exemplary metadirectory 100 are shown. The metadirectory 100 includes a rules layer 102 (described in more detail with reference to FIG. 3); an executive layer 104. (described in more detail with reference to FIG. 4); and a storage layer 106, having a core 108 and a buffer 110 (described in more detail with reference to FIG. 2). The metadirectory 100 is in operable communication with an exemplary information universe 112, which includes one or more remote repositories 114 of information.

Figure 2:
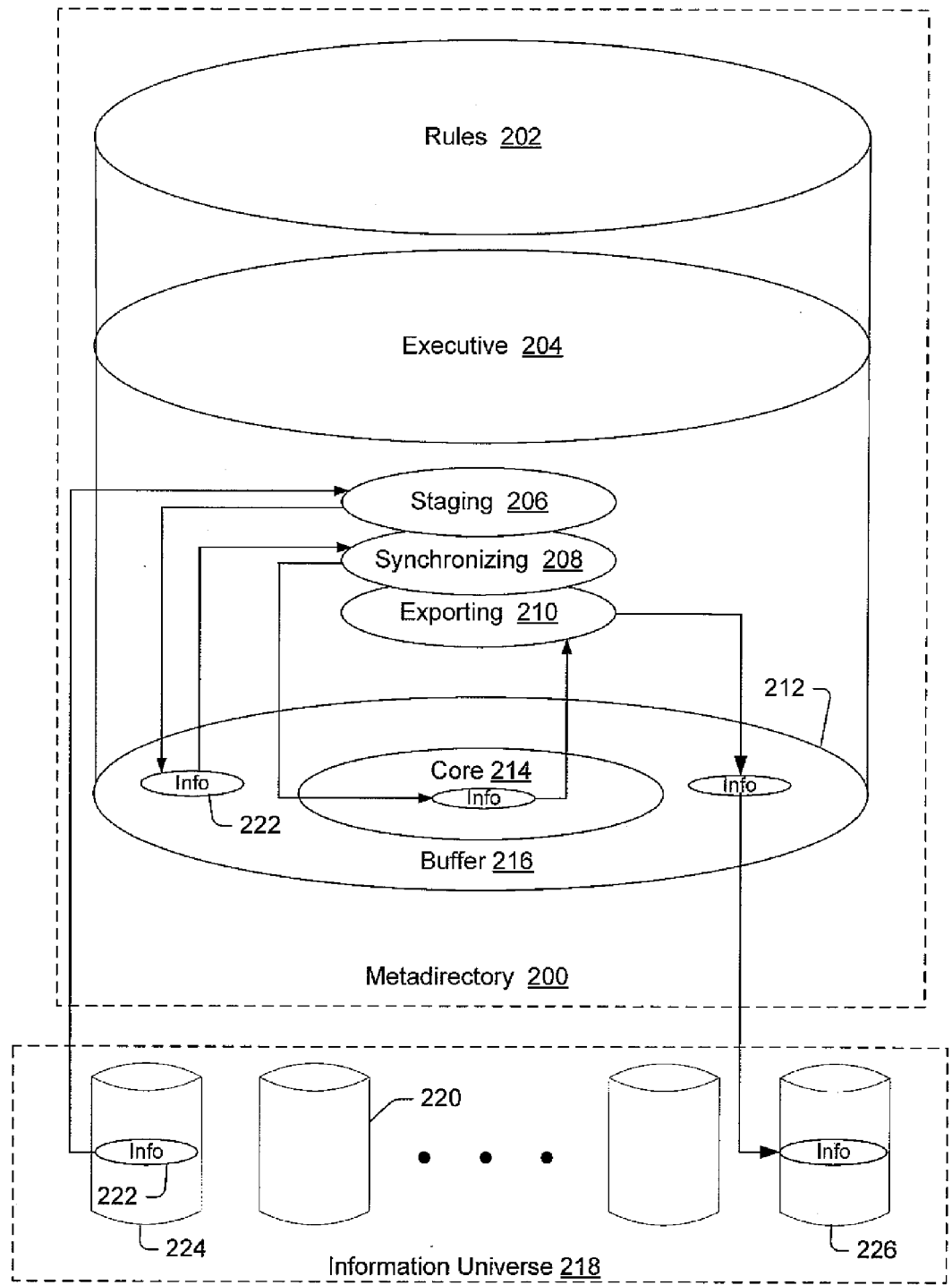
FIG. 2 is a block diagram illustrating another exemplary multilayer architecture for use in a metadirectory scenario.

Referring to FIG. 2, another exemplary metadirectory 200 is shown having six exemplary layers: a rules layer 202, an executive layer 204, a staging layer 206, a synchronizing layer 208, and exporting layer 210, and a storage layer 212. As in FIG. 1, the storage layer 212 includes an exemplary core 214 and an exemplary buffer 216. An exemplary information universe 218 including one or more exemplary information repositories 220, is in operable communication with the metadirectory 200. In the exemplary metadirectory 200, the staging layer 206, the synchronizing layer 208, and the exporting layer 210 may be part of, or work in conjunction with, the executive layer 204, to stage, synchronize, and/or export information between the information universe 218 and the metadirectory 200.

Generally, information 222 from a repository 224 is communicated to the metadirectory 200. The exemplary staging layer 206 buffers the information 222 in the buffer 216 in accordance with rules in the rules layer 202. The synchronizing layer 208 may synchronize (i.e., reconcile) the information 222 with other information in the metadirectory 200 according to rules in the rules layer. The exemplary synchronizing layer 208 may include a synchronizing engine that performs various synchronizing functions. The exemplary rules layer 202 may include a rules engine to interface with the staging layer 206, the synchronizing layer 208, and the export layer 210, for performing functions necessary to apply the rules.

From the buffer 216, an association may be made between the information 222 in the buffer 216 and information in the core 214. For example, the information 222 may be copied into the core 214. The information 222 may then be moved out of the core into the buffer 216, where it is prepared to be exported out to the remote repositories 220. The exemplary export layer 210 exports (i.e., propagates) the information out to repository 226, according to the rules of the rules layer 202, thereby ensuring that the repository 224 and the repository 226 have consistent information 222.

The exemplary storage layer 212 includes any storage media as may be known in the art. The core 214 and the buffer 216, likewise, include any storage media as may be known in the art. The storage layer 212, core 214, and buffer 216 may also include application programming interfaces (APIs), as well as processing functionality, for handling calls to store, format, retrieve, and otherwise process information at the storage layer 212. For example, the storage layer 212 may include a structured query language database (SQL), in which the storage layer 212 handles queries to a database. In an exemplary implementation, the metadirectory core and/or buffer may be configured as a flat namespace(s).

The exemplary remote repositories 220 include storage media to store information, as well as any data handling functionality as may be necessary to communicate the information to and from the metadirectory 200. Exemplary types of repositories 220 are network operating systems (e.g., Microsoft Windows NT®), directory services (e.g., Active Directory®, Novell eDirectory®, SunONE/iPlanet Directory®, X.500 systems), email systems (e.g., Lotus Notes®, Microsoft Exchange 5.5®), application systems (e.g., PeopleSoft®, Enterprise Resource Planning (ERP), telephone switches, and Extensible Markup Language (XML) and Directory Services Markup Language (DSML) systems), database systems (e.g., Microsoft® SQL Server, Oracle®, and IBM DB2®), and file-based systems (e.g., DSMLv2, Lightweight Directory Interchange Format (LDIF), and delimited, fixed width, and/or attribute value pairs text documents).

In an organizational setting, the information 222 represents any entity that an organization wants to represent, observe, track, analyze, and/or otherwise monitor using computer means. Examples of entities are employees, accounts, resources, applications, and the like. In implementations described herein, the information 222 is one or more objects having attributes (i.e., properties) that are descriptive or representative of the entity. Objects have an associated object type, which is a classification of the object, such as "employee" type, "printer" type, "application" type, etc. Thus, an object whose object type is "employee", may include attributes such as the employee's name, social security number, phone number, title, department, address, etc. While the information 222 is described herein as being an object, the information 222 may be any computer-implemented representation of an entity.

As discussed below in more detail, in one implementation, objects in the buffer 216 can be connector objects or disconnector objects. A connector object is an object that is linked to an object in the core 214. A disconnector object is an object that is not linked to an object in the core 214. By linking, or not linking, objects in the buffer 216 to objects in the core 214, according to rules in the rules layer 202, unique combinations of data objects and attributes can be designed into the core 214, whereby the core 214 may be considered a rules-directed aggregate of information from the information universe 218. In this exemplary implementation, utilizing connector objects and disconnector objects, the buffer 216 may be referred to as a connector space, and the core 214 may be referred to as an aggregate space.

Figure 3:
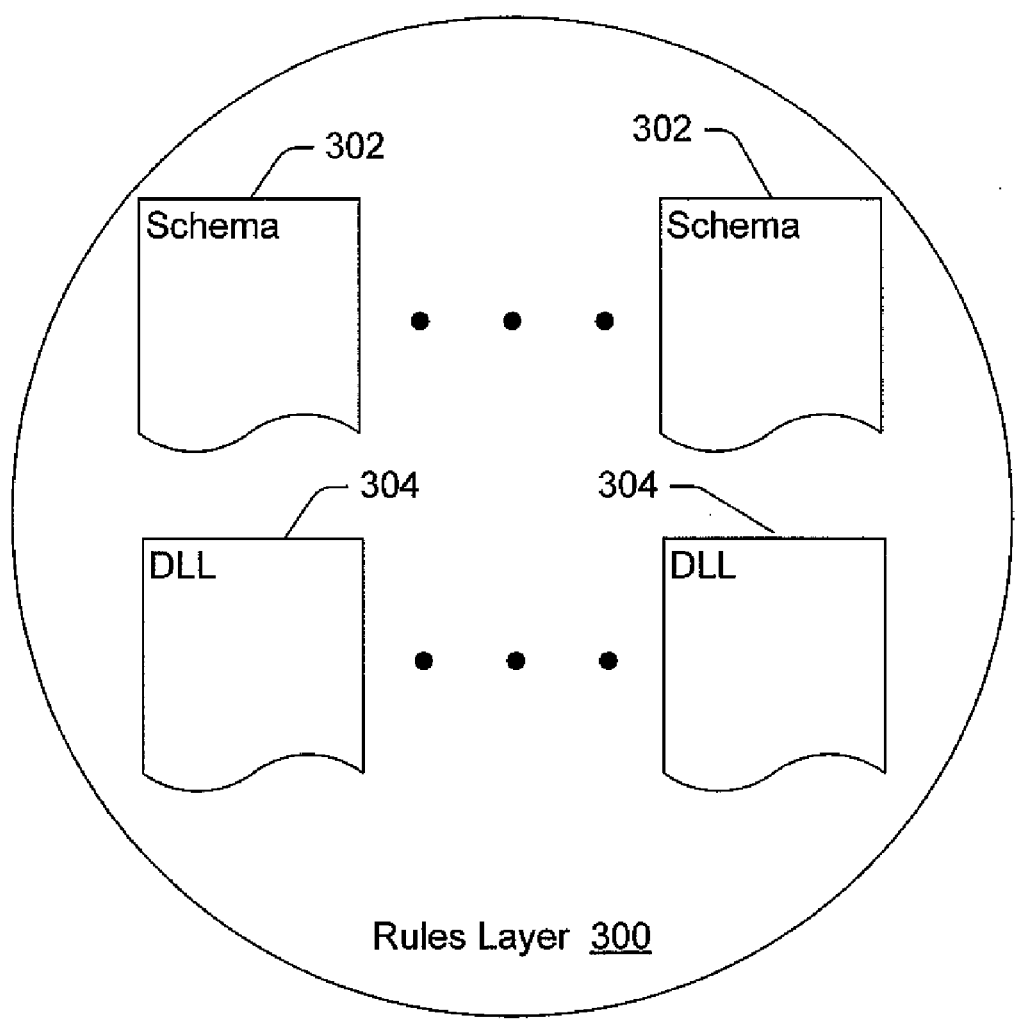
FIG. 3 is a block diagram illustrating an exemplary rules layer.

FIG. 3 illustrates an exemplary rules layer 300. The exemplary rules layer 300 includes declarative rules that may be applied to data from one or more data repositories for aggregating the data. A particular implementation of the rules layer 300 includes one or more schemas 302, and/or one or more dynamic-link libraries (dlls) 304, which are used to ensure that information flow into, within, and out of, a metadirectory (e.g., the metadirectory 100, FIG. 1; and the metadirectory 200, FIG. 2) is in accordance with metadirectory policies. Thus, it is to be understood that use of schemas 302 are only one mechanism for assuring conformance to metadirectory policies, and that other mechanisms besides schemas may be used instead of, or in addition to, schemas without deviating from the scope.

Each of the exemplary schemas 302 is a model for describing the structure of information processed by the metadirectory. The schemas 302 also include criteria specifying how data is processed in the metadirectory. In general, a separate schema may be developed and applied at any place within the metadirectory that information crosses a boundary. For example, with regard to the metadirectory 200 of FIG. 2, an import schema may be applied to the information 222 when the information 22 is received from the remote repository 224. As another example, a core schema may be applied to the information 222 when it is moved from the buffer 216 into the core 214. Schemas 302 may hold information such as system configuration information, data format specifications, and others.

More specifically, in a particular implementation, the following schemas are employed:
  Management Agent (MA) Schema,
  Remote Repository Schema,
  Connector filter Schema,
  Join Schema,
  Project Schema,
  Export Attribute Flow Schema,
  Run Configuration Schema,
  Deprovisioning Schema
  Import Attribute Flow Schema, and
  Metadirectory Core Schema.

The MA Schema (described in more detail below) specifies criteria for MA interactions with the associated remote repository. The remote repository (RR) schema models the structure of data received and processed by a management agent (described in more detail below). For example, the RR schema may define the object types and attributes used by the remote repository. The Connector filter Schema (described in more detail below) models a rules engine filter that is employed by a synchronization engine during importing and/or exporting of data objects. The Join Schema (described in more detail below) models one or more rules for joining an object in a metadirectory buffer (e.g., the buffer 216, FIG. 2) with an object in a metadirectory core (e.g., the core 214, FIG. 2).

The Project Schema (described in more detail below) models one or more rules for projecting an object into a metadirectory core (e.g., the core 214, FIG. 2). The Export Attribute Flow Schema (described in more detail below) models one or more rules for associating an attribute in a metadirectory core (e.g., the core 214, FIG. 2) with an object in a metadirectory buffer (e.g., the buffer 216, FIG. 2). The Run Configuration Schema (described in more detail below) models the configuration of the metadirectory core (described in more detail below).

The Import Attribute Flow Schema (described in more detail below) describes how attribute values should flow from an object in a metadirectory buffer (e.g., the buffer 216, FIG. 2) to an object in a metadirectory core (e.g., the core 214, FIG. 2). The Core Data Schema (described in more detail below) models configuration of a management agent (described in more detail below).

One or more DLL(s) 304 include sets of rules and/or specifications for managing data. An exemplary DLL 304 includes rules extensions that may be used by the metadirectory to combine data from two source attributes (e.g., surName and givenName) and flow them to one target attribute (e.g., displayName).

In an exemplary implementation, the following types of rules may be specified in the rules layer 300, using schemas, or otherwise:
  attribute flow rules,
  connector filter rules,
  deprovisioning rules,
  export attribute flow rules,
  import attribute flow rules,
  join rules,
  mapping rules, projection rules, and provisioning rules.

Other rules may be implemented as may be useful to a particular metadirectory design. Brief descriptions of the rules above are as follow:

attribute flow rules (also called attribute flow precedence rules and attribute mapping rules): Attribute flow refers to synchronization or mapping of attributes between an object in the remote directories, the metadirectory buffer, and the metadirectory core. The attribute flow rules specify the process of attribute flow.

connector filter rules (also called disconnector rules): Rules that specify prevention of linking (connecting) objects in the metadirectory buffer to objects in the metadirectory core.

deprovisioning rules: Rules that specify how a metadirectory buffer object is processed after it has been disconnected (i.e., unlinked) from a metadirectory core object.

export attribute flow rules: Export attribute flow refers to the process of flowing attributes of objects in the metadirectory core to objects in the metadirectory buffer. Export attribute flow rules specify the process of export attribute flow.

import attribute flow rules: Import attribute flow refers to the process of flowing attributes of objects in the metadirectory buffer to objects in the metadirectory core. Import attribute flow rules specify the process of import attribute flow.

join rules: Rule that specify the process of linking an object in the metadirectory buffer to an object in the metadirectory core.

mapping rules: Rules that establish a data flow relationship from a source attribute to a target attribute.

projection rules: Rules that specify the process of creating an object in the metadirectory core and linking the created object to another object in the metadirectory buffer.

provisioning rules: Provisioning is the process of creating, renaming, and/or deprovisioning objects in the metadirectory buffer based on a change to an object in the metadirectory core. Provisioning rules specify the process of provisioning.

Figure 4:
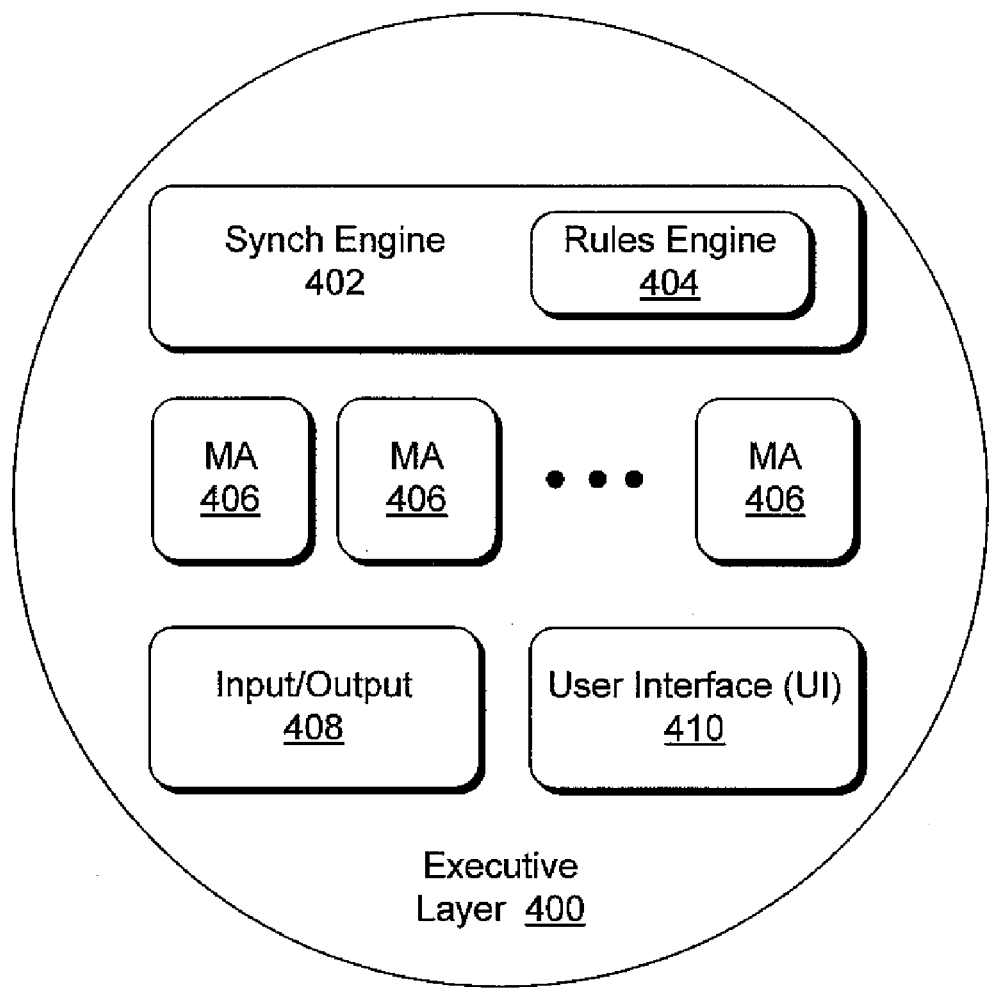
FIG. 4 is a block diagram illustrating an exemplary executive layer.

FIG. 4 is a block diagram illustrating an exemplary executive layer 400 for use in a metadirectory. In general, the executive layer 400 includes hardware, firmware, or computer-executable code modules (or any combination thereof) to implement one or more metadirectory services. The exemplary modules in the executive layer 400 are suitable for execution on a virtual machine, runtime engine, and the like, and are thereby useable in a .NET® environment. The exemplary executive layer 400 includes a synchronization engine 402, a rules engine 404, one or more management agents 406, an input/output module 408, and a user interface (UI) 410.

The exemplary synchronization engine 402 performs synchronization of objects in a metadirectory buffer and/or a metadirectory core. Synchronization refers to a process of maintaining consistency among multiple sources of data. In the context of an exemplary metadirectory, synchronization involves utilizing attribute flow precedence to combine similar data into a final version that is stored in the metadirectory core. This data is then exported from the metadirectory core to remote repositories.

The exemplary SE 402 may include a rules engine 404. An exemplary Rules Engine 404 provides rules analysis functions that direct the creation of objects and the flow of attributes within the metadirectory. For example, the rules engine 404 may analyze connector filter criteria of a buffer object to determine whether the buffer object should be connected (e.g., joined or projected) to an object in the metadirectory core.

The one or more exemplary MAs 406 communicates with remote data repositories to receive data objects, stage the objects, and transfer data objects out to the remote repositories. The exemplary MAs 406 convert repository information received in one format (e.g., Active Directory®, Oracle®) into an isomorphic form, such that all data in the buffer is in a common form. Each of the exemplary MAs 406 has a user interface (UI) associated with it, whereby a user can access the MA 406. Via an MA UI, a user may cause the MA 406 to perform a specified run (i.e., execute a task), such as an import run and an export run. The user can also read and update various information (e.g., version, configuration, description) associated with the MA 406 through an MA UI. Applications may also communicate with MAs 406 via application programming interfaces (APIs) provided by the I/O module 408.

In addition to providing APIs, the exemplary I/O module 408 performs standard input/output tasks to communicate from the metadirectory and to one or more remote repositories. The exemplary I/O module 408 implements and supports any communications protocols suitable to the design, such as, but not limited to, Distributed Component Object Model (DCOM), Windows® Management Instrumentation (WMI), Hypertext Markup Language (HTML), and Simple Object Access Protocol (SOAP).

The exemplary User Interface (UI) 410 is an interface to the various modules in the executive layer, and in the metadirectory in general. The UI 410 enables a user to access, update, and otherwise interact with the metadirectory modules and the data therein. For example, a user may request download of an MA 406 configuration to perform test runs on a remote computer. As another example, a user may review synchronized data objects prior to importing the data objects into the metadirectory core.

Figure 5:
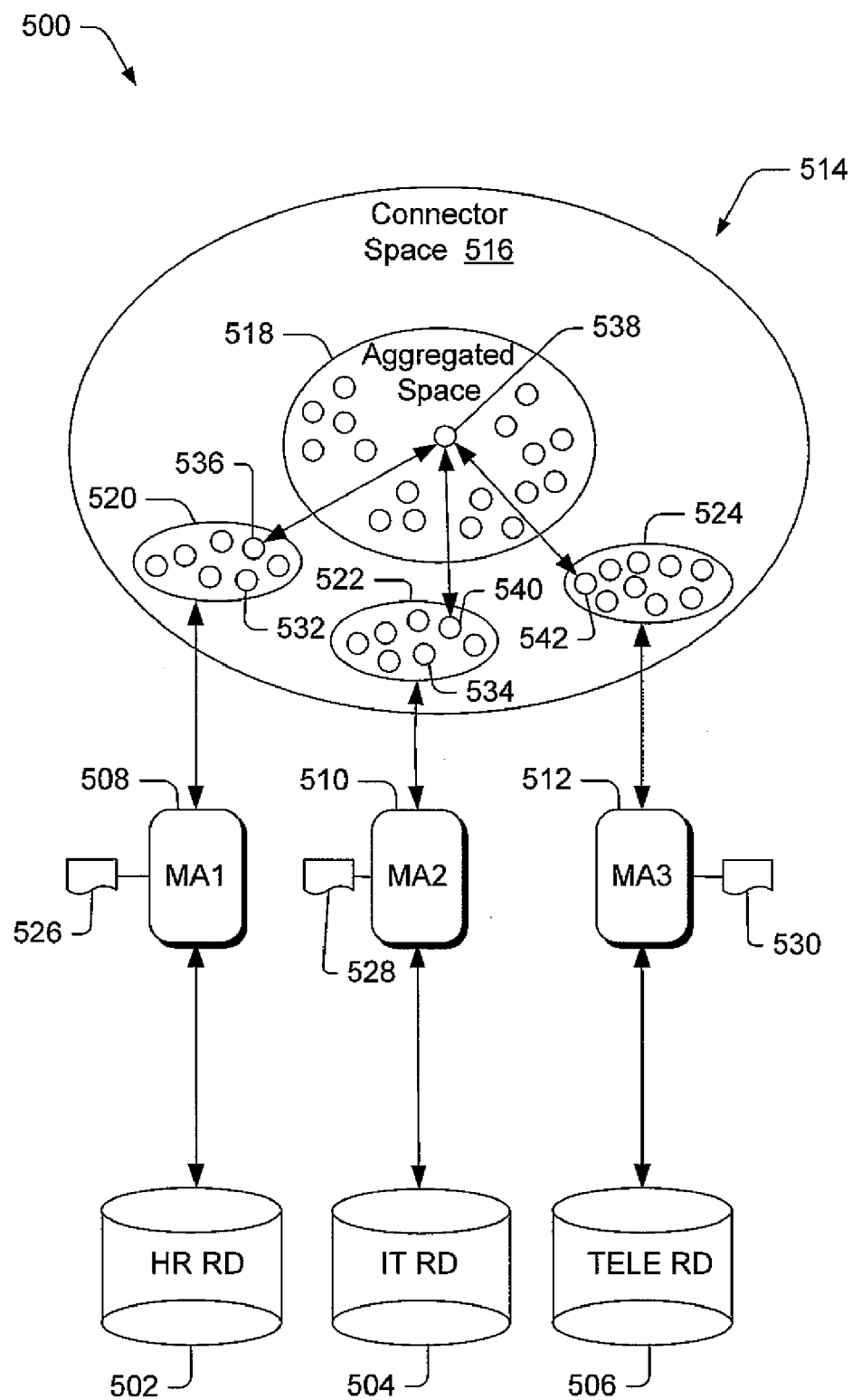
FIG. 5 is a block diagram illustrating an exemplary environment for use in a metadirectory scenario.

FIG. 5 is a block diagram illustrating an exemplary environment 500 for use in a metadirectory scenario. The exemplary environment includes a human resources (HR) remote directory (RD) 502, an information technology (IT) RD 504, and a telephone RD 506. The HR RD 502 is in operable communication with a first management agent (MA1) 508. The IT RD 504 is in operable communication with a second management agent (MA2) 510. The telephone RD 506 is in operable communication with a third management agent (MA3) 512.

MA1 508, MA2 510, and MA3 512 are in operable communication with storage 514. The storage 514 is an exemplary implementation of the storage layer 106, shown in FIG. 1 and/or the storage layer 212, shown in FIG. 2. The exemplary storage 514 is partitioned, or otherwise divided, into a first namespace, called a connector space (CS) 516, and a second namespace, called an aggregated space (AS) 518. The CS 516 is an exemplary implementation of the metadirectory buffer 110, shown in FIG. 1, and/or the metadirectory buffer 216, shown in FIG. 2. The AS 518 is an exemplary implementation of the metadirectory core 108, shown in FIG. 1, and/or the metadirectory core 214, shown in FIG. 2.

The connector space 516 is partitioned, or otherwise divided, into one or more connector space regions that are used by the MAs. MA1 508 communicates with a first connector space region (CS1) 520. MA2 510 communicates with a second connector space region (CS2) 522. MA3 512 communicates with a second connector space region (CS3) 524.

Each of the MAs uses the MA's associated connector space regions to import, and otherwise process objects from the MA's associated RD. For example, MA1 imports objects from the HR RD 502 and populates CS1 520 with the imported objects. The MAs may import objects from the RDs at any time. For example, the MAs may import objects periodically, or upon the occurrence of a specified event, such as power-up, or user request. Each of the MAs may import objects independently from the other. In one exemplary implementation, MA2 510 imports objects from IT RD 504 whenever IT RD 504 powers up, while MA3 512 imports objects from telephone RD 506 once per day. In another exemplary implementation, a user may initiate a simultaneous import at MA1, MA2, and MA3.

Each of MA1 508, MA2 510, and MA3 506, has a schema, schema 526, schema 22 528, and schema 530, respectively, associated with the MA. The schemas each may have information, such as rules or data filters, that are specific to the MA associated with the schema. The exemplary schemas, 526, 528, and 530 may or may not be stored in the storage 514. In a particular implementation, the schemas are stored in a separate storage area that is accessible to the MAs and a synchronization engine. Exemplary schemas are discussed in detail below.

To illustrate and exemplary metadirectory operation, an exemplary scenario is described. The exemplary HR RD 502 transmits one or more objects to the MA1 508. The MA1 508 populates the CS1 520 with the one or more HR objects 532 that the MA1 6 508 receives from the HR RD 502. The MA1 508 may transform, or otherwise format the one or more received HR objects 532 according to rules specified in the schema 526. Similarly, the exemplary IT RD 504 transmits one or more IT objects to the MA2 510. The MA2 510 populates the CS2 522 with the one or more IT objects 534 that the MA2 510 receives from the IT RD 504. The MA2 510 may transform, or otherwise format the one or more received IT objects 534 according to rules specified in the schema 528.

The exemplary HR objects 532 and the IT objects 534 may be aggregated into the aggregated space (AS) 518 during a synchronization process. For example, an HR object 536 may be joined with an exemplary aggregated objected 538, which corresponds to the HR object 536. The aggregated object 538 may correspond to the HR object 536 if the two objects are person objects, having the same "name" value for their "name" attributes.

Likewise, an IT object 540 and a Tele object 542 may be joined to the aggregated object 538. After the HR object 536, the IT object 540, and the Tele object 542 are joined to the aggregated object 538, attributes of the objects 536, 540, and 542 may be imported to the aggregated object 538. For example, the "name" attribute of the HR object 536 may be imported to the aggregated object 538, the "e-mail address" attribute of the IT object 540 may be imported to the aggregated object 538, and the "home telephone" attribute of the Tele object 542 may be imported to the aggregated object 538.

Attributes of the aggregated object 538 can be exported to joined objects in the connector space 516. For example, the "name" attribute of the aggregated object 538 may be exported to the IT object 540 and the Tele object 542. As another example, the "e-mail address" attribute of the aggregated object 538 may be exported to the HR object 536 and the Tele object 542. As a further example, the "home telephone" attribute of the aggregated object 538 may be exported to the IT object 540 and the HR object 536. After the attributes are exported, and the objects are synchronized, the HR objects, the IT objects, and the Tele objects may be transmitted to the HR RD 502, IT RD 504, and Tele RD 506, respectively.

Figure 6:
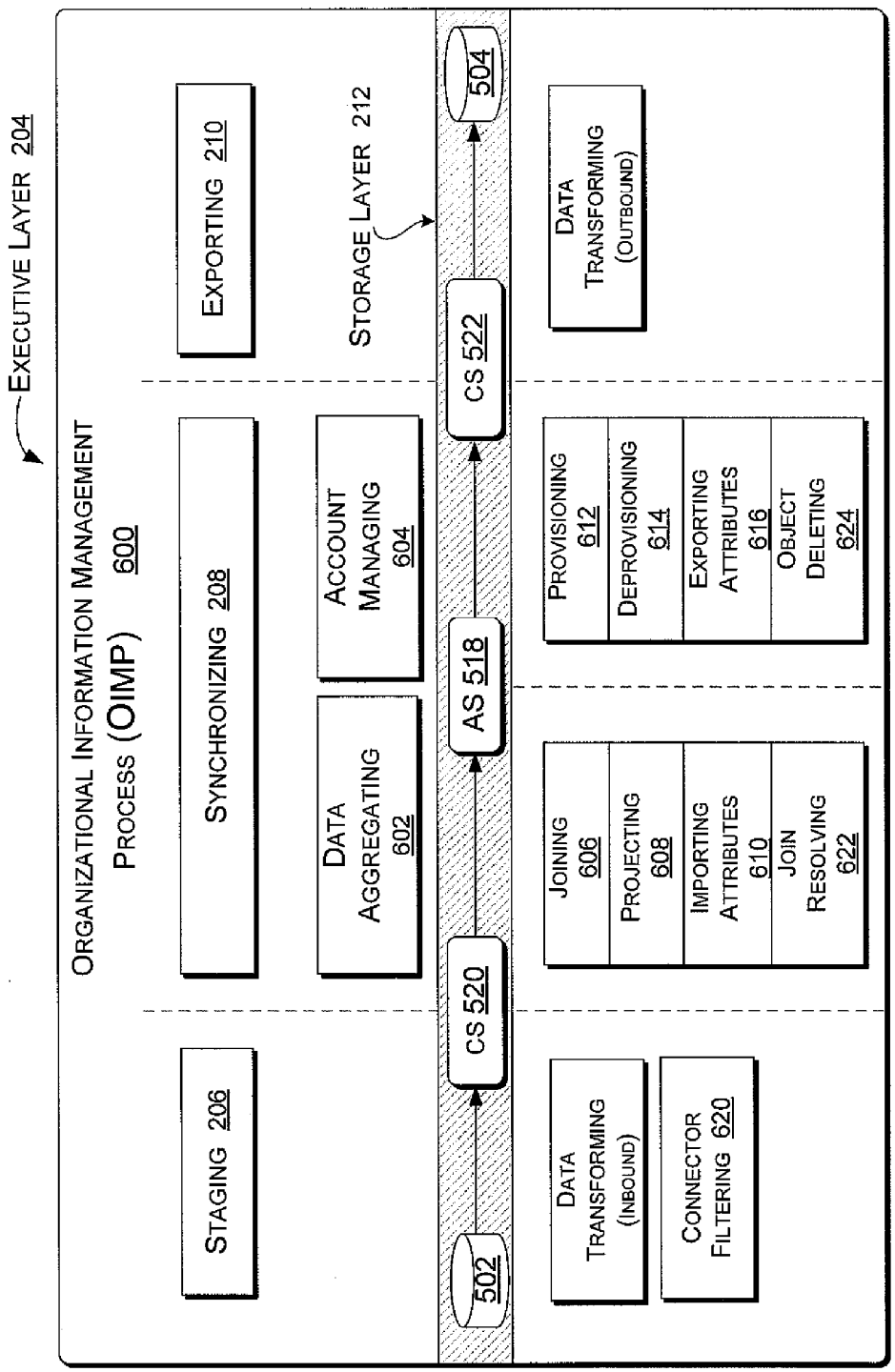
FIG. 6 is a block diagram of an exemplary identity information management process.

FIG. 6 illustrates an exemplary "organizational information management process" (OIMP) 600 that can be implemented in an environment such as the environment shown in FIG. 5. The exemplary OIMP 600 includes staging (e.g., staging 206, FIG. 2) synchronizing (e.g., synchronizing 208, FIG. 2), and exporting (e.g., exporting 210, FIG. 2), as well as other data processing that facilitates data integrity across more than one connected information source.

Such additional processes include, for example, data aggregating 602, and account managing 604. Further, such additional processes may have sub-processes. For example, data aggregating 602 may include joining 606, projecting 608, importing attributes 610, and join resolving 622. Joining 606, for example, is a process that may involve establishing a service to determine whether an attribute of an object in the connector space 520 will be joined with an object in the aggregated space 518. Account managing 604 may include provisioning 612, deprovisioning 614, exporting attributes 616, and object deleting 624. A connector filtering module 620 has a functionality which is described above and below.

In general, such processes and/or sub-processes may be carried out by any of a variety of modules described herein, including, one or more Management Agents (MA), a synchronization engine (SE), a rules engine (RE), or an MA controller. Any or all of such modules carry out the exemplary processes shown in FIG. 6 in accordance with rules and/or specifications, examples of which are described in detail below. Such rules and/or specifications may be flexible and extensible and may be designed to ensure that the most valued, most correct, and/or user-selected data reside in the aggregated space 518 and in one or more connected information sources 504, as appropriate to the particular setting. Some of these processes and sub-processes will be discussed in more detail below with respect to customization of the exemplary rules by which the processes are implemented.

In some implementations of the exemplary metadirectory 200 the processes in the exemplary OIMP 600 are executed in a relatively well-defined sequence; that is to say, the various parts of the exemplary OIMP 600 are not performed at random, haphazardly, or in total separation from each other. Many of the processes performed with respect to the OIMP 600 are done so as specified in rules, as discussed throughout. Exemplary rules are implemented as schemas in Extensible Markup Language (XML), discussed in detail below.

Exemplary Metadirectory Schemas

As discussed above, an implementation of a metadirectory includes rules defining how data is managed by the metadirectory. Such rules may define any aspect of the data management process, such as, but not limited to, data import, data export, data synchronization, data syntax, data priority, etc. The rules ensure data integrity by creating consistency among the various processes, functions, and systems that may affect the data. Also as discussed, many rules may be effectively implemented using schemas.

Below, a number of exemplary schemas are described for use in a metadirectory. While schemas may be in any of various known formats, the schemas described herein are primarily shown in extensible markup language (XML) format. Those skilled in the art will readily appreciate that the exemplary schemas may be implemented using other known formats, such as, but not limited to, any Standard Generalized Markup Language(SGML)-based language, or a proprietary binary format.

Exemplary Management Agent Schemas

A client may request that the metadirectory export one or more MA configurations (or the entire server configuration) to the client. In an exemplary metadirectory, the client uses an MA user interface (UI) or command line utility to cause the MA configuration to be exported. The MA configuration may also be imported into the metadirectory. MA configuration data is modeled by an MA Schema. The MA Schema sets forth the import and export formats of MA configuration data that clients will communicate to and receive from an MA. Shown below is an exemplary MA Schema:

```
<ma-data>
    <format-version>1</format-version>
    Naming information
    Versioning information
    Generic MA rule configuration
    Controller configuration
    Password sync configuration
    UI configuration
    Private configuration
    Encrypted attribute configuration
    Partition configuration
    Run Profile configuration
</ma-data>
```

The outermost element of the MA Schema, <ma-data>, contains a sub-element called <format-version>, which provides the version of XML format of the schema. In one particular embodiment, export and import MA's with XML format version "1", the version of the XML described in this document.

In future releases of MMS, we may need add new features and express them through a new or extended XML format. In that case the format-version will be increased, and MMS will probably allow importing multiple versions of the XML format.

The naming element in the exemplary MA Schema is a group of sub-elements that describes various high-level information about the MA. As an example of how the naming element might be used, in one implementation, sub-elements in the name element are specified to a Distributed Component Object Model (DCOM) interface when an MA is created. An exemplary naming element is shown below:

```
<id>{3F5AA741-626E-483F-BB2D-EE0F5E73CE02}</id>
<name>Ad Shadow</name>
<category>AD</category>
```

The id sub-element is a Globally Unique Identifier (GUID) that uniquely defines the MA in the system. Generally, the id sub-element is passed to the metadirectory server on calls involving creation or modification of an MA. In an exemplary metadirectory, the id is saved to an MA configuration file when the id's associated MA configuration is exported via certain commands, such as "Export To File" or "Save Server Configuration". In this implementation, once the MA is created, the value of the id does not change, but remains persistent to uniquely identify the MA during operation.

With regard to the naming sub-element in the naming element, an exemplary name sub-element is a non-empty string that provides the user interface (UI) a display name of the associated MA in the system. In one implementation, the naming string is enforced to be unique by the metadirectory. In any implementation, designers may impose restrictions on the characters allowed in, and the length of, the naming string; such restrictions, if any, may depend on the file system being used by the metadirectory. The naming sub-element may be modified by a user.

The category sub-element in the naming element refers to the type of MA. The type of MA refers to the type of remote repository to which the MA interfaces. MA (and remote repository) types may be broken down into sub-types. A non-exhaustive list of MA (and remote repository) types and sub-types is shown in Table 1 below:

TABLE 1

| Type | Sub-type(s) |
| --- | --- |
| LDAP | Active Directory ® (AD) |
| | ADAM |
| | ADGAL |
| | iPlanet |
| | Exchange |
| | Exchange GAL |
| | NDS |
| File | Fixed |
| | Delimited |
| | AVP |
| | LDIF |
| | DSML |
| Other | MSSQL ® |
| | Oracle ® |
| | NT ® |
| | Lotus Notes ® |

Referring now the versioning element of the MA Schema, the versioning element is a group of sub-elements that provides versioning information about the MA design. In one implementation, the sub-elements of the versioning element are read-only and are returned by the metadirectory upon request for informational purposes.

An exemplary versioning element is as follows:

```
<creation-time>
    2002-07-23 17:12:23.699
</creation-time>
<last-modification-time>
    2002-07-23 19:21:17.699
</last-modification-time>
<version>5</version>
```

The creation-time sub-element indicates the time at which the MA was created on the metadirectory server. The last-modification-time sub-element indicates the time at which the design of the MA was last modified on the metadirectory server. The creation-time and the last-modification-time may be given in any units suitable to the particular implementation (and in accordance with the schema). In one implementation, the times are given in Greenwich Mean Time (GMT).

The version sub-element indicates the version of the MA configuration. In one implementation of the MA schema, higher values indicate later versions of the MA's configuration. The version sub-element may be used to identify and prevent situations in which more than one user is simultaneously editing an MA by comparing a previous MA version number (prior to an edit) with the current MA version number in the metadirectory. If the previous version number is less than the current version, the modification will fail.

An exemplary Generic MA rule configuration of the MA Schema includes sub-elements that indicate the configuration of MA rules. The MA rule configuration may be specified by a user. An exemplary Generic MA rule configuration schema follows:

```
<schema>
    ...
</schema>
        <attribute-inclusion>
            <attribute>description</attribute>
            <attribute>displayname</attribute>
            <attribute>givenname</attribute>
            <attribute>manager</attribute>
            <attribute>member</attribute>
            <attribute>samaccountname</attribute>
            <attribute>sn</attribute>
        </attribute-inclusion>
        <connector-filter />
        <join />
        <projection />
        <export-attribute-flow />
        <provisioning-cleanup type="declared">
            <action>make-explicit-disconnector</action>
        </provisioning-cleanup>
    <extension>
        <assembly-name>IFMA.dll</assembly-name>
        <application-protection>low</application-protection>
    </extension>
```

The exemplary schema sub-element of the Generic MA rules configuration is preferably in a DSML format and describes object types and attribute available in the remote repository associated with the MA. The MA may query the MA's associated remote repository to retrieve a remote repository (RR) schema that defines the object types and attributes available in the RR.

The attribute-inclusion sub-element lists one or more attributes that should be imported from the MA's associated remote repository. In one implementation of the MA Schema, only attributes that appear in the attribute-inclusion sub-element can be part of any of the sub-elements which follow (e.g., connector-filter, join, project, import attribute flow, export attribute flow, etc).

The connector-filter sub-element specifies whether an object in the metadirectory buffer is to stay as a disconnector object in metadirectory buffer, or be imported into the metadirectory core during synchronization. The connectory-filter rules describe a Rules Engine (e.g., the Rules Engine 404, FIG. 4) filter that is employed by a Synchronization Engine (e.g., the Synchronization Engine 402, FIG. 4) during the process of importing/exporting objects. The rules in the connectory-filter sub-element can express filtering conditions based on characteristics of an imported object.

Prior to describing how connector-filter might be used, several types of connectors and disconnectors are defined that are used a particular implementation. Explicit disconnectors are objects that a user has explicitly (e.g., through an administrative UI) specified to remain disconnectors, regardless of the connector-filter rules. Connector-filter disconnectors are objects that are disconnectors by virtues of application of the connector-filter rules. Normal disconnectors are objects not linked to a core object and that are neither explicit disconnectors nor connector-filter disconnectors.

In one implementation of the metadirectory, the connector-filter rules are used as follows: when an object is first imported, it is evaluated against the connector-filter (see connector-filter schema described below) before join/projection is attempted. If the object satisfies (as described below with reference to the connector-filter schema) the filter, then the Synchronization Engine marks that object as a normal disconnector and will not attempt to join/project the object. Conversely, if the object does not satisfy the filter, then the Synchronization Engine will not mark that object as a normal disconnector, thereby allowing join/projection actions for the object.

Continuing with the exemplary connector-filter rules, when a delta to the object is imported, the object will be reevaluated against the connector-filter. If the object is currently a normal connector (i.e., has an associated join), and the delta causes the object to satisfy connector-filter criteria, the join associated with the normal connecter will be broken and the object will be marked as a normal disconnector. If the object is currently a normal disconnector, and the delta causes the object to no longer satisfy the connector-filter, the object will be sent through the join/project rules for processing, where it may become a normal connector or remain a normal disconnector.

Continuing with the exemplary connector-filter rules, a reapply-rules process may be executed, wherein the connector-filter is applied to all non-explicit connectors and disconnectors as described in the preceding paragraph. The connector-filter is not applied to explicit connectors or disconnectors because their explicit status exempts them.

Connector-filter rules are also applied in a number of export situations in which data may otherwise become inconsistent. If the connector-filter rules were not applied in such export situations, changes to objects that are exported to a remote repository that might cause subsequent disconnections when the objects are re-imported. Such situations include provisioning of a new object, renaming of an object, and performing export attribute flow. In such situations, if the metadirectory buffer object satisfies the connector-filter, then an error will be generated and the transaction (e.g., provisioning, renaming, or attribute exporting) will be rolled back.

The connector-filter rules may be implemented in a top-level <connector-filter> element which may contain multiple <filter-set> sub-elements, each of which specify filter conditions for specific remote repository object types. The following provides the full XML format for exemplary connector-filter rules. Each portion will be discussed in detail individually in the sections that follow.

```
<connector-filter>
    <filter-set cd-object-type="cdObjectType" type=(declared |
        scripted) id="guid">
        <filter-alternative id="guid">
            <condition cd-attribute="attributeName"
                        intrinsic-attribute=(true | false)
                        operator=(equality |
                            inequality |
                            less-than |
                            less-than-or-equal |
                            greater-than |
                            greater-than-or-equal |
                            present |
                            not-present |
                            substring-start |
                            not-substring-start |
                            substring-end |
                            not-substring-end |
                            substring-any |
                            not-substring-any |
                            bit-on |
                            bit-off )>
                <value ui-radix="radix">operandValue</value>
            </condition>
            ...
        </filter-alternative>
        ...
    </filter-set>
    ...
</connector-filter>
```

In this particular implementation, an undefined filter or an empty <connector-filter> element (i.e. one with no sub-elements) indicates that no filtering is configured and that join/ projection is attempted on all imported objects that are currently non-explicit disconnectors.

In this implementation, each <filter-set> sub-element describes filtering conditions for a specific remote repository object type as configured by the attribute "cd-object-type". Each <filter-set> sub-element is uniquely configured for a particular remote repository object type. Each <filter-set> is either declarative or scripted as indicated by the attribute "type", which is either "declared" or "scripted", respectively. The "id" attribute is optional and its presence depends on the configured "type" as described below.

A declarative <filter-set> is configured with one or more <filter-alternative> sub-elements, each of which may have an "id" attribute. Each <filter-alternative> defines a series of conditions involving the distinguished name (DN) and/or attributes of an imported object. An object is said to satisfy a <filter-alternative> if the object's DN and attributes meet all the defined conditions. An implicit "or" exists between all <filter-alternative> elements, such that an object need only satisfy one alternative in order to satisfy the filter.

A scripted <filter-set> may be used in scenarios where simple declarative rules are insufficient to describe the filtering requirements and is expressed as an empty <filter-set> element (i.e. it does not have any <filter-alternative> sub-elements). A scripted <filter-set> specifies an "id" attribute that uniquely identifies the rule. Thus, an exemplary "id" is a GUID in brace format, such as {534A9523-A3CA4BC5-ADA0-D6D95D979425}.

In one implementation of a <filter-set>script, the script is user-written and accepts a metadirectory buffer object as input and determines if the object satisfies the filter based on the remote repository properties of the object. Thus, the script output will be a Boolean status indicating whether the input object satisfied the connector-filter.

The filtering process will apply the appropriate <filter-set> based on the object type of the imported object. If no applicable <filter-set> is found, then no filtering is performed on the object and a join or projection process will be applied to the object. However, if an appropriate <filter-set> has been identified, then the imported object is either evaluated against each <filter-alternative> (if declarative), or passed to the user-written script for evaluation (if scripted). If the imported object satisfies the filter, then the object is marked in the metadirectory buffer as a normal disconnector and the join or projection process will not be applied to the object. Conversely, if the filter is not satisfied, then the normal join/projection process will be applied to the object, if possible.

In an exemplary implementation of the connector-filter schema, the <filter-alternative> element encapsulates a set of logical conditions that is used to evaluate the suitability of an object for processing based on its attribute values and/or DN. If the object satisfies every condition, then a TRUE result is yielded and the alternative is considered to have been satisfied.

Expressed in XML, an exemplary <filter-alternatives> sub-element takes the following format:

```
<filter-alternative id="guid">
    <condition cd-attribute="attributeName1 "
    operator="operation">attrValue1 </condition>
    <condition cd-attribute="attributeName2 "
    operator="operation">attrValue2 </condition>
    <condition cd-attribute="attributeName3 "
    operator="operation">attrValue3 </condition>
    ...
</filter-alternative>
```

Filter conditions are logical expressions that describe the attribute or DN requirements that an object must satisfy. The application of an individual condition can yield a TRUE result if the object meets the condition, or a FALSE result if it does not. The condition expressions are effectively 'and'ed together in order to compute an overall result for the <filter-alternative>. That is, all sub-element conditions must resolve to TRUE in order for the <filter-alternative> to be satisfied.

The value "cd-attribute" identifies the repository (or directory) attribute to which the condition applies. Exemplary attribute types are string, reference-based, numeric, and Boolean. The value "intrinsic-attribute" is set to "true" if "cd-attribute" identifies an attribute that is intrinsic to the metadirectory. In an exemplary implementation, by default "intrinsic-attribute" is set to "false".

The "operator" attribute defines an operation to perform. The general purpose "equality" and "inequality" operators allow for direct comparison of the complete distinguished name (DN) or attribute value of an object against a specified value. Operators can apply to both string and non-string attribute values.

The "less-than", "less-than-or-equal", "greater-than", and "greater-than-or-equal" operators apply to numeric attribute values. Such operators can be used for comparing an attribute value to a specified value. To test whether an attribute is present in or absent from an object, the "present" and "not-present" operators can be used, respectively. In one implementation, the "present" and "not-present" operators are employed if the <value> element is empty or unspecified.

If only a portion of a string attribute or the DN is of interest, then the "substring-start" or "substring-end" operators can be employed to check for equality at the start or end, respectively. To match any part of a string attribute, the "substring-any" operator can be employed for this purpose. Negative substring operators are also available, namely "not-substring-start", "not-substring-end", and "not-substring-any". In one implementation, string comparisons are case insensitive and accent sensitive.

Bitwise operators "bit-on" and "bit-off" may be used to specify a type of bit operation. In an exemplary implementation, a bit mask specified in the <value> element is bitwise "and"ed with a numeric attribute value. If the "and" operation yields a result that is equal to the bit mask, and a "bit-on" operator is specified, a TRUE condition is obtained. If the "and" operation yields 0, and a "bit-off" operator is specified, a TRUE condition is obtained.

The contents of the <value> element in the <connector-filter> schema specify one of the operands employed in the comparison (the other operand is sourced from the object itself). When specifying a value for a numeric attribute type, the value may be expressed in hex format with a "0x" prefix. The "ui-radix" attribute allows the UI to preserve the radix in which user numeric data was originally entered. When dealing with multi-valued attributes, the condition may be interpreted as a test to determine if any value in the object matches the value specified by the <value> element. As discussed, for the "bit-on" and "bit-off" operators, the <value> element specifies the bit mask used in the operation.

Another example of a <connector-filter> schema in XML format is shown below in more detail:

```
<connector-filter>
    <filter-set cd-object-type="contact" type="declared">
        <filter-alternative id="{234A9523-A3CA-4BC5-
        ADA0-D6D95D979422}">
```

-continued

```
            <condition cd-attribute="employeeID"
               intrinsic-attribute="false" operator="not-
               present">
                  <value/>
               </condition>
         </filter-alternative>
         <filter-alternative id="{334A9523-A3CA-4BC5-ADA0-
            D6D95D979423}">
            <condition cd-attribute="rdn" intrinsic-attribute=
               "false" operator="equality">
                  <value>Jane Doe</value>
               </condition>
         </filter-alternative>
         <filter-alternative id="{434A9523-A3CA-4BC5-ADA0-
            D6D95D979424}">
            <condition cd-attribute="dn" intrinsic-attribute=
               "true" operator="equality">
                  <value>cn=JaneDoe,o=Microsoft</value>
               </condition>
         </filter-alternative>
      </filter-set>
      <filter-set cd-object-type="user" type="declared">
         <filter-alternative id="{534A9523-A3CA-4BC5-
            ADA0-D6D95D979425}">
            <condition cd-attribute="title" operator=
               "substring-start">
                  <value>administrator</value>
               </condition>
            <condition cd-attribute="company"
               operator="equality">
                  <value>Microsoft</value>
               </condition>
         </filter-alternative>
         <filter-alternative id="{634A9523-A3CA-4BC5-
            ADA0-D6D95D979426}">
            <condition cd-attribute="mail" operator=
               "equality">
                  <value>administrator@Microsoft.com</value>
               </condition>
         </filter-alternative>
         <!-- filter out if not a normal account (0x200) -->
         <filter-alternative id="{734A9523-A3CA-4BC5-
            ADA0-D6D95D979427}">
            <condition cd-attribute="userAccountControl"
               operator="bit-off">
                  <value ui-radix="16">0x200</value>
               </condition>
         </filter-alternative>
         <!-- filter out if a disabled account (0x2) -->
         <filter-alternative id="{834A9523-A3CA-4BC5-
            ADA0-D6D95D979428}">
            <condition cd-attribute="userAccountControl"
               operator="bit-on">
                  <value ui-radix="10">0x2</value>
               </condition>
         </filter-alternative>
      </filter-set>
      <filter-set cd-object-type="organization"
         type="scripted" id="{934A9523-A3CA-
            4BC5-ADA0-D6D95D979429}/>
      <filter-set cd-object-type="organizationalUnit"
         type="scripted" id="{A34A9523-
            A3CA-4BC5-ADA0-D6D95D97942A}/>
</connector-filter>
```

Referring again to the Generic MA rule configuration schema shown above, the <join> sub-element governs how a metadirectory synchronization engine (e.g., the synchronization engine 402, FIG. 4) should join an object in the metadirectory buffer (e.g., buffer 216, FIG. 2) to an object in the metadirectory core (e.g., core 214, FIG. 2). In one implementation, a join operation involves searching the metadirectory core for an object that corresponds to an object in metadirectory buffer, and then linking the corresponding objects.

As mentioned previously, an object in the metadirectory buffer may be "joined" to an object in the metadirectory core.

In one implementation, joining two objects involves establishing a link between the two objects that enables subsequent attribute flow to occur between the two objects. Until a metadirectory buffer object is joined to a metadirectory core object, the metadirectory buffer object does not affect the metadirectory core because no relationship to the metadirectory core exists. After a metadirectory buffer object is joined to a metadirectory core object, the buffer object can affect the core object (and vice versa) in various ways, examples of which are discussed in more detail herein.

In one implementation, when an object is received by the metadirectory buffer, an attempt is made to join the metadirectory buffer object to an object in the metadirectory core. If an object exists in the core that corresponds to the buffer object, the two objects will be joined. In cases where no corresponding object can be found in the metadirectory core, a new core object is projected (if enabled by the Core Projection Rules and the Run Configuration Rules) and the metadirectory buffer object is automatically joined to the new core object. The Join Rules are also applied during to pending updates to the metadirectory core when a disconnector object in the metadirectory buffer is changed to a connector object.

Maintenance processing may be employed to re-evaluate all existing joins against the defined join rules, as well as to evaluate normal disconnectors for potential joining. During both updating and maintenance processing, explicit disconnectors (those created with Account Joiner or buffer deprovisioning rules) are not evaluated for joining and will remain as disconnectors. In one implementation, whenever a normal disconnector object is run through the Connector Filter (discussed above) the object will be projected and/or joined to a core object if the disconnector object passes the filter.

A join is performed for a metadirectory buffer object by initiating a search for objects in the metadirectory core that match defined search criterion. Any join candidates found during the search are then passed to a resolution handler to perform validation of the result (in the case of a single join candidate) or to identify a single join target (in the case of multiple join candidates). After a metadirectory core object has been identified as the join target, the metadirectory core object is joined to the metadirectory buffer object. In one implementation, the join rules specify the search criterion, the method of join resolution/validation, handling of ambiguous results, and scoping of join rules by CD object types.

Exemplary Join Rules for an MA are expressed in XML and specify criterion for joining two objects. In one implementation, the user defines the Join Rules through a UI that will create and store these rules in XML on the metadirectory server. The Rules Engine will employ these stored rules in the course of executing join actions initiated by either a MA run or by Account Joiner. Exemplary Join Rules for an MA can be defined in a declarative manner, with provision for programmatic rules via a user-written script where complexity requires it. Exemplary XML Join Rules Schema is shown below:

```
<join >
   <join-profile cd-object-type="cdObjectType">
      <join-criterion id="GUID1">joinCriterion1</join-criterion>
      <join-criterion id="GUID2">joinCriterion2</join-criterion>
      <join-criterion id="GUID3">joinCriterion3</join-criterion>
      ...
   </join-profile>
   ...
</join >
```

The <join> element can encapsulate multiple <join-profile> elements. Each <join-profile> specifies the join search criterion that are specific to a particular object type. Users, for example, might be configured with one <join-profile>, whereas contacts might be configured with a different profile.

Each <join-profile> specifies the object type to which it applies to by means of a "cd-object-type" attribute. In a particular implementation, only one <join-profile> is allowed with the same "cd-object-type". Within each <join-profile>, multiple <join-criterion> elements can be configured with an implicit priority order (i.e., a prioritized "or" exists between each <join-criterion>). An exemplary join process evaluates each <join-criterion> in priority sequence in search of a join target until either a single join target is identified or the search is exhausted and no join target has been identified.

Within a <join-profile> element, the <join_criterion> element is responsible for configuring the search criterion as well as the method of join resolution. In a particular implementation, each <join-criterion> operates independently as there is no relationship between <join-criterion> searches. The following exemplary <join_criterion> schema illustrates join criterion:

```
<join-criterion id="GUID">
    <collation-order>CollationOrder string</collation-order>
    <search mv-object-type="mvObjectType">
        <attribute-mapping
            intrinsisc-attribute=(true | false)
            mv-attribute="mvAttributeName">
            attributeMapping
        </attribute-mapping>
        ...
    </search>
    <resolution      type=(none | scripted)>
        <script-context>contextString</script-context>
    </resolution>
</join-criterion>
```

In the <join-criterion> schema above, the "id" for <join-criterion> is a GUID that uniquely identifies the join criterion rule (e.g., "{934A9523-A3CA-4BC5-ADA0-D6D95D979429}"). In one implementation of the metadirectory, the UI will generate a GUID and set it as an attribute of the join-criteria element when a new one is added.

The exemplary <collation-order> element specifies how any string comparisons that need to be done by the search should be performed by an SQL Server. For each locale id there is generally more than one collation order that the user can choose, allowing the user to choose whether to be case insensitive, accent insensitive, and the like. The <collation-order> tag is optional and defaults to the default SQL Server collation for an exemplary metadirectory database.

The exemplary <search> element specifies a set of AND-ed conditions on the values of the metadirectory core object being searched for. Each condition is specified by an <attribute-mapping> element. The exemplary content of the <attribute-mapping> element, "attributeMapping," may be a direct or scripted attribute mapping fragment such as:

```
        <direct-mapping>
            <src-attribute>cdAttributeName</src-attribute>
        </direct-mapping>
or
        <scripted-mapping>
            <src-attribute>cdAttributeName</src-attribute>
            ...
```

-continued

```
            <script-context>contextString</script-context>
        </scripted-mapping>
```

Although these mappings have the same syntax as used in attribute flow, the semantic meaning is different. Each mapping means that a value(s) from the metadirectory buffer attribute (direct-mapping) or a calculated value(s) (script-mapping) is compared to the metadirectory core attribute given by "mv-attribute" according to the table below. There is an optional Boolean attribute "intrinsic-attribute" used to signify that the metadirectory core attribute designated by the "mv-attribute" attribute is an "intrinsic" metadirectory attribute (not an attribute in the schema, but metadata exposed by metadirectory for an object). The default value for the "intrinsic-attribute" attribute is "false."

Table 2 illustrates exemplary actions to take in response to successful comparisons of attributes in objects from remote repositories to attributes from objects in the metadirectory core.

TABLE 2

| Remote Repository Attribute | Core object attribute | Successful comparison |
|---|---|---|
| Direct mapping of single valued attribute in RR | Single valued core attribute | RR attribute value equals the core attribute value |
| Direct mapping of multi-valued attribute in RR | Single valued core attribute | One of RR attribute values equal to the core attribute value |
| Direct mapping of single valued attribute in RR | Multi-valued core attribute | RR attribute value equal to one of the core attribute values |
| Direct mapping of multi-valued attribute in RR | Multi-valued core attribute | One of RR attribute values equal to one of the core attribute values |
| Scripted mapping generates a single value | Single valued core attribute | Scripted value equals the core attribute value |
| Scripted mapping generates multiple values | Single value core attribute | One of scripted values equals the core attribute value |
| Scripted mapping generates a single value | Multi-valued core attribute | Scripted value equals one of the core attribute values |
| Scripted mapping generates multiple values | Multi-valued core attributes | One of the scripted values equals one of the core attribute values |

In this implementation, "equality" includes different conditions, depending on the types of values being compared. As an example, equality of strings is based on the collation-order set for the criterion, whereas binary and integer comparisons test for exact value matches.

In an exemplary implementation, the object search can be further scoped by specifying an "mv-object-type." The "mv-object-type" attribute is optional. If it is omitted, then the object type will match all core object types. The search element includes one or more mapping sub-elements. The <resolution> sub-element is used when the "type" attribute is "scripted." The <resolution> sub-element indicates that a user-written script entry point should be called to validate a single result or pick between multiple search results coming back from the search. The actual script will be defined in the scripting object for the MA. The user-defined <script-context> string allows the script to determine the context in which it has been invoked (i.e. from which <join-criterion> element). The callout to the script will return a BOOL to indicate whether the join target has been successfully resolved. It will also be possible to return a new object type for the metadirectory core object in the case of successful comparison. If the script is unable to resolve the join target because of further ambiguous results, then an exception may be issued.

In one implementation, the <resolution> element is mandatory. The <resolution> element may specify a desired resolution script, or the <resolution> element may be left empty with "type" set to "none." An exemplary resolution script has the following parameter list:

IN: buffer object to join
IN: join criterion context string so the script knows how it is being invoked
IN: array of core join candidates
OUT: index of the resolved join target in the core join candidates array
OUT: optional authoritative core object type to be updated on join target The optional core object type parameter is employed when the resolution script has the ability to determine updates to the object type of the core join target object. This ability might be beneficial in interforest-type scenarios where temporary placeholder objects (e.g., a "contact") may be initially imported into the core from a non-authoritative source, and it may be desirable to have the authoritative source override the object type when joining to it (e.g., change a "contact" to a "user").

When a resolution script indicates that the object type of the core object must change, the connector object in the buffer is joined to the core object. Subsequently, all attribute values contributed by the metadirectory buffer objects joined to a core object, will be recalled, the object type of the core object will be changed, and attributes will be re-imported from all the buffer objects joined to the core object. After doing so, provisioning and export flow processes are performed.

An ambiguous result may occur if multiple potential join candidate objects are found during the join search and a single join target object cannot be identified. In one implementation, if the <join-criterion> ends with such ambiguous results, or no results, the join process will advance to the next <join-criterion>.

To further illustrate the Join Rules Schema, another detailed exemplary Join Rules Schema is shown below:

```
<join>
    <join-profile cd-object-type="user">
        <join-criterion id="{934A9523-A3CA-4BC5-ADA0-D6D95D979429}">
            <search mv-object-type="user">
                <attribute-mapping mv-attribute="uid">
                    <direct-mapping>
                        <src-attribute>empId</src-attribute>
                    </direct-mapping>
                </attribute-mapping>
                <attribute-mapping mv-attribute="company">
                    <constant-mapping>
                        <constant-value>Microsoft</constant-value>
                    </constant-mapping>
                </attribute-mapping>
            </search>
            <resolution type="scripted">
                <script-context>Criterion1</script-context>
            </resolution>
        </join-criterion>
        <join-criterion id="{534A9523-A3CA-4BC5-ADA0-D6D95D979425}">
```

-continued

```
            <search mv-object-type="user">
                <attribute-mapping mv-attribute="mail">
                    <direct-mapping>
                        <src-attribute>alias</src-attribute>
                    </direct-mapping>
                </attribute-mapping>
            </search>
            <resolution type="scripted">
                <script-context>Criterion2</script-context>
            </resolution>
        </join-criterion>
    </join-profile>
    <join-profile cd-object-type="prov-user">
        <join-criterion id="{5C875108-D0CD-471a-9D9C-BC3E9C2C4A12}">
            <search mv-object-type="user">
                <attribute-mapping intrinsic-attribute="true" mv-attribute="object-id">
                    <direct-mapping>
                        <src-attribute>mv-object-id</src-attribute>
                    </direct-mapping>
                </attribute-mapping>
            </search>
            <resolution type="none"/>
        </join-criterion>
    </join-profile>
    <join-profile cd-object-type="contact">
        <join-criterion id="{134A9523-A3CA-4BC5-ADA0-D6D95D979421}">
            <search mv-object-type="user">
                <attribute-mapping intrinsic-attribute="false" mv-attribute="mail">
                    <direct-mapping>
                        <src-attribute>mail</src-attribute>
                    </direct-mapping>
                </attribute-mapping>
            </search>
            <resolution type="none"/>
        </join-criterion>
    </join-profile>
</join>
```

Referring again to the generic MA rule configuration schema, the projection rules schema specifies how metadirectory buffer objects, if any, are projected as new entries in the core. As described herein, an exemplary metadirectory includes a core Synchronization Engine and a Rules Engine for employing the projection rules. Such an implementation provides for separation of the rules logic from the synchronization duties, thereby dividing up tasks among distinct modules that specialize in those tasks.

In an exemplary metadirectory implementation, a set of projection rules is associated with an MA. Projection rules specify the manner in which metadirectory buffer objects are projected into the metadirectory core. Projections rules may be defined either in a declarative manner, or programmatically via a user-written script. When the user defines the rules declaratively the mappings may be specified by the user in the configuration UI.

In a particular implementation, the Projection Rules specify enabling and/or disabling projection of buffer space objects into the core space, declaratively mapping of remote repository objects into core space object types, and/or programmatically projecting objects via user-written script(s).

In a particular implementation, two properties are set when creating a new metadirectory core object: a distinguished name (DN) and an object type. In this implementation, the DN may be a persistent system generated GUID. The Projection Rules may specify whether an object is to be projected from a remote repository into the metadirectory core, and, if so, the appropriate object type to employ for the projection of objects from. Exemplary object type mappings (discussed further below) specify types which indicate whether a mapping is prohibited, scripted, or declarative. Thus, the projection rules are an exemplary mechanism by which object type mappings can be specified.

Declarative mappings allow a user to specify types of metadirectory core objects that should be created when a given remote repository object type is to be projected. Each declarative mapping is an object type pair that identifies both a source remote repository object type and a destination metadirectory core object type. Such declarative mappings may be one-to-one mappings or many-to-one mappings. An example of a many-to-one mapping is a mapping of both "employee" object types and "contact" object types to a "user" object type in the core. A many-to-one mapping may be accomplished by employing two distinct mappings (e.g., one mapping for "employee" to "user", and another for mapping "contact" to "user").

A user-written script can be used in scenarios where simple declarative mappings are not sufficient to determine the metadirectory core object type. An exemplary implementation of a mapping script accepts a metadirectory buffer object as input and, based on the object type and/or attributes, the script determines an appropriate metadirectory core object type. The mapping script may also selectively determine whether or not to project a buffer object into the core.

The following exemplary pseudo-schema outlines how the Projection Rules may be configured in XML:

```
<projection>
    <class-mapping id="GUID" cd-object-type="cdClass"
        type={"none"|"declared"|"scripted"}>
        <mv-object-type>mvClass</mv-object-type>
    </class-mapping>
    ... additional <class-mapping> elements ...
</projection>
```

A particular implementation of a projection rule schema includes an ID GUID associated with the mapping rule, <class-mapping>. The GUID may be used to identify lineage properties on the associated object for object change tracking purposes. The UI randomly generates these GUIDs as the user modifies/creates the projection rules.

If the type is "scripted" then a user-written script determines whether to project and, if so, the appropriate object type to employ. Note that the name of the script method is not specified in the schema shown above. However, in a particular implementation, there may be a specified naming convention (e.g., method named Projecto, etc.) that a customer may follow when authoring a script. An exemplary script has the following parameter list:

IN: CS object to project
OUT: TRUE/FALSE projection status
OUT: MV object type if projected In exemplary projecting rules, if the type is "none" the imported objects will be staged in the metadirectory buffer as normal disconnectors, but will not be projected into metadirectory core.

To further illustrate the projection rules, the following exemplary detailed schema may be used to implement projection rules:

```
<projection>
    <class-mapping type="declared"
        id="{934A9523-A3CA-4BC5-ADA0-
            D6D95D979429}"
        cd-object-type="contact">
        <mv-object-type>user</mv-object-type>
    </class-mapping>
        <class-mapping type="declared"
            id="{734A9523-A3CA-4BC5-ADA0-
                D6D95D979427}"
            cd-object-type="user">
            <mv-object-type>user</mv-object-type>
        </class-mapping>
        <class-mapping type="declared"
            id="{534A9523-A3CA-4BC5-
                ADA0-D6D95D979425}"
            cd-object-type="group">
            <mv-object-type>group</mv-object-type>
        </class-mapping>
</projection>
```

The foregoing example demonstrates a many-to-one mapping where both the remote repository object types "contact" and "user" are mapped to the metadirectory core "user" object type. Additionally, the remote repository object type "group" is to be mapped to the metadirectory core object type "group".

The following provides an example of how a user-wntten script can be configured to control buffer to core projection:

```
<projection>
    <class-mapping type="scripted"
        id="{934A9523-A3CA-4BC5-ADA0-D6D95D97942A}"
        cd-object-type="contact">
    </class-mapping>
</projection>
```

In the above example case, the rules specify that a script should be called to project objects received from a remote repository that have a "contact" object type. Note that in the scripted case, the mv-object-type element is not specified.

The following provides an example of how to configure the Projection Rules to disable projection into the metadirectory core:

```
<projection>
    <class-mapping type="none"
        id="{934A9523-A3CA-4BC5-ADA0-D6D95D97942A}"
        cd-object-type="contact"/>
</projection>
```

In the above example, the rules specify that remote repository "contact" object type should not be projected into the metadirectory core.

Referring again to the Generic MA rule configuration, the export-attribute-flow element may be used to specify how values of attributes on metadirectory core objects should be flown back to connected metadirectory buffer objects (i.e., be exported). Export attribute flow (EAF) rules describe how attribute values should flow from core objects to linked buffer objects. In one implementation, the EAF rules are declared in an MA-centric fashion, and thus, may be specified for each MA.

In an exemplary implementation, the EAF rules provide a mapping, which describes how to generate a destination attribute value given a set of source attribute values. The EAF rules may also provide a flow, which encapsulates the mapping, providing metadata (a unique ID and mapping configuration) and scoping based on the destination attribute.

Attribute flows are grouped into flow sets, wherein the groups are based on source object type and destination object type. Thus, a flow can be used to define a relationship between a single destination attribute in the metadirectory buffer, and any number of source attributes from a single object type in the metadirectory core.

Exemplary export attribute flow (EAF) rules may be encapsulated in a top-level <export-attribute-flow> element. Multiple flow sets are defined within the <export-attribute-flow> element. The flow sets define how object types in the metadirectory buffer are related to object types in the metadirectory core. To illustrate and exemplary <export-attribute-flow> format, an XML schema is shown below:

```
<export-attribute-flow>
    <export-flow-set cd-object-type="object type"
    mv-object-type="object type">
        <export-flow cd-attribute="attribute name"
                id="guid"
                suppress-deletions="true">
            <direct-mapping>
                <src-attribute>attribute name</src-attribute>
            </direct-mapping>
        </export-flow>
        <export-flow cd-attribute="attribute name" id="guid">
            <direct-mapping>
                <src-attribute intrinsic="true">object-id</src-attribute>
            </direct-mapping>
        </export-flow>
        <export-flow cd-attribute="attribute name" id="guid">
            <scripted-mapping>
                <src-attribute>attribute name</src-attribute>
                <src-attribute>attribute name</src-attribute>
                <script-context>context string</script-context>
            </scripted-mapping>
        </export-flow>
        <export-flow cd-attribute="attribute name" id="guid">
            <constant-mapping>
                <constant-value>value</constant-value>
            </constant-mapping>
        </export-flow>
        ...
    </export-flow-set>
    <export-flow-set cd-object-type="object type"
    mv-object-type="object type">
        ...
    </export-flow-set>
    ...
</export-attribute-flow>
```

Exemplary <export-attribute-flow> mappings describe how to generate a destination metadirectory buffer attribute value (or values) given one or more source metadirectory core attribute values. Three exemplary types of mappings are shown: direct, scripted, and constant. Each type of mapping has an associated XML element: <direct-mapping>, <scripted-mapping>, and <constant-mapping>, respectively. A general format for attribute mappings is illustrated in the following exemplary schemas:

```
<direct-mapping>
    <src-attribute>attribute name</src-attribute>
</direct-mapping>
<direct-mapping>
    <src-attribute intrinsic="true">object-id</src-attribute>
</direct-mapping>
<scripted-mapping>
    <src-attribute>attribute name</src-attribute>
    <src-attribute>attribute name</src-attribute>
    <src-attribute intrinsic="true">object-id</src-attribute>
    <script-context>context string</script-context>
```

```
</scripted-mapping>
<constant-mapping>
    <constant-value>value</constant-value>
</constant-mapping>
```

Flows encapsulate mappings, providing metadata (a unique ID and mapping configuration) and scoping by destination CS attribute. In one implementation, flows are defined via the <export-flow> element, which may have a mapping sub-element. Exemplary <export-flow> elements may define the attributes cd-attribute and id, and may optionally define the attribute suppress-deletions. Below is an example of an <export-flow> element XML.

```
<export-flow cd-attribute="attribute name" id="guid"
        suppress-deletions="false">
    <direct-mapping>
        <src-attribute>attribute name</src-attribute>
    </direct-mapping>
</export-flow>
```

The exemplary cd-attribute attribute provides scoping for the mapping sub-element by defining the mapping's destination metadirectory buffer attribute associated with the mapping. The value of cd-attribute may be the name of a schema-defined buffer attribute that is a member of the destination buffer object type (as defined by the <export-flow-set> element-see below) or an auxiliary class that can possibly be found associated with the destination buffer object type.

Associated with each exemplary mapping is metadata that may be used to identify and configure the mapping. A unique GUID ID associated with a mapping is defined by an id attribute whose value may be a GUID in normal brace format This mapping ID may be used when tracking rules contributions during preview mode runs (described in more detail in the related U.S. patent application, Ser. No. 10/435712, entitled "Preview Mode").

In one implementation, a mapping configuration indicates whether or not deletions should be suppressed for the mapping; i.e., whether or not NULL values and deletions on source attributes are to be transferred to destination attributes as a delete or suppressed/ignored. This configuration option may be specified via the optional suppress-deletions attribute, which may take on the values "true" and "false", the default being "false". Exemplary actions taken based on mapping configurations are discussed in further detail below.

Within an exemplary top-level <export-attribute-flow> element can be one or more <export-flow-set> elements, each of which can contain one or more <export-flow> elements. The <export-flow-set> elements act to define child flow declarations by a source metadirectory core object type and destination metadirectory buffer object type. The following exemplary schema illustrate an exemplary <export-flow> element:

```
<export-flow-set cd-object-type="object type"
mv-object-type="object type">
    <export-flow cd-attribute="attribute name"
            id="guid">
        ...
    </export-flow>
    ...
</export-flow-set>
```

Flow and mapping sub-elements of the <export-flow-set> element define flows or relationships between a metadirectory buffer object type and metadirectory core object type pair. More specifically, the exemplary <export-flow-set> element shown above defines cd-object-type and mv-object-type attributes that serve to define the scope of sub-elements by source metadirectory core object type and destination metadirectory buffer object type. In an exemplary implementation, the value of the cd-object-type attribute is the name of a buffer object type defined in a destination MA's schema, and the value of the mv-object-type attribute is the name of an object type defined in the Core schema (described in further detail below). In one implementation, each flow set corresponds to one source core object type and one destination buffer object type. An exemplary <export-attribute-flow> element is shown below in XML:

```
<export-attribute-flow>
    <export-flow-set cd-object-type="User"
    mv-object-type="person">
        <export-flow cd-attribute="email"
                id="{9E691F4E-4301-
                4112-B964-CE7E8A\F7CAC}"
                suppress-deletions="true">
            <direct-mapping>
                <src-attribute>email</src-attribute>
            </direct-mapping>
        </export-flow>
        <export-flow cd-attribute="description"
                id="{8F15B855-0517-40f8-
                9AE9-0565600C0017}">
            <scripted-mapping>
                <src-attribute>email</src-attribute>
                <src-attribute>description</src-attribute>
                <script-context>contextString</script-context>
            </scripted-mapping>
        </export-flow>
        <export-flow cd-attribute="uid"
                id="{DCC92CCA-A2DA-4060-
                8605-78755F072616}">
            <direct-mapping>
                <src-attribute intrinsic="true">
                object-id</src-attribute>
            </direct-mapping>
        </export-flow>
    </export-flow-set>
    <export-flow-set cd-object-type="Contact"
    mv-object-type="person">
        <export-flow cd-attribute="linked"
                id="{A3D569E9-5DD9-4ece-
                8AB6-4A4BA4b5554A}">
            <constant-mapping>
                <constant-value>some value</constant-value>
            </constant-mapping>
        </export-flow>
    </export-flow-set>
</export-attribute-flow>
```

As discussed, mappings defined in the <export-attribute-flow> elements, a destination buffer attribute value (or values) may be generated, based on one or more source core attribute values. In one exemplary implementation, EAF mappings include a "suppress deletions" configuration option that can be used to keep NULL values and deletes from flowing from the core to the buffer. The behavior of this option is detailed below in the section entitled "EAF Operations". The EAF element may or may not be used to validate calculated destination values against a destination remote repository schema. For example, pending exports may be compared to objects/values in a remote repository schema by requesting a buffer object. A user can perform such a validation check if an object fails to export, to determine why the failure occurred.

A mapping in the <export-attribute-flow> may be a "direct mapping." More specifically, the intrinsic attribute core object ID may be declared as the source attribute for an EAF direct mapping. In an exemplary implementation, the core object ID is treated a string value that is directly mapped to the associated destination (i.e., buffer object) attribute. For example, individual bytes in a core (source) GUID of "{befa5fc6-1661-47b4-9c34-deff19525cda}" will be formatted as a string prior to being exported to the associated buffer space attribute.

Four exemplary operations related to EAF are described below. These exemplary operations include full synchronization, delta synchronization, reference synchronization, and "back-to-source" synchronization. These operations may be referred to as full sync, delta sync, ref sync or ref-retry, and "back-to-source" sync, respectively. In a particular implementation, the synchronization engine (SE) determines when to invoke any of the EAF operations.

Full sync may be called the first time a source core object is synchronized to a newly connected destination metadirectory buffer object. The full sync may also be run when running in re-evaluate rules mode. During full sync, all objects and attributes are exported from the metadirectory core to the metadirectory buffer.

Delta sync may be called when a source metadirectory core object has previously been synchronized to a destination metadirectory buffer object. During a delta sync, only values that have changed in the core object are exported to the corresponding object in the metadirectory buffer.

An attribute in a first object in the metadirectory core may reference a second metadirectory core object. If the second metadirectory core object is linked to or unlinked from a metadirectory buffer object, the attribute values (called reference attribute values) related to the first core object may be changed as a result. The ref sync operation may be called to export the reference attribute values to an object in the buffer that corresponds to the first object in the core.

Some SE operations that change metadirectory buffer objects (and/or attributes) can trigger another synchronization involving updating the core based on the change in the buffer, and again updating the buffer based on the update to the core. The "back-to-source" sync operation may be called when such a "re-synchronization" occurs. When executing a mapping, all values are flowed from core to metadirectory buffer.

The ref sync operation "reverts" updates imported attribute values to match attribute values calculated in the EAF process.

For a given source metadirectory core object and destination metadirectory buffer object, an EAF mapping is said to be "in-scope" if the mapping's source core object type (mv-object-type) and destination buffer object type (cd-object-type) match those of the core and buffer objects, respectively.

For a given source core object and destination buffer object, an EAF mapping is said to be "satisfied" if the core object has a value for at least one of the mapping's source attributes (src-attribute).

In general, sync operations take a source core object and a destination buffer object as input and attempt to execute in-scope, satisfied mappings to flow attributes from the core object to the buffer object. Each sync operation may differ from the other synch operations with regard to which attributes are considered when checking to determine if a mapping is satisfied, and which values are flowed when executing a direct mapping.

When determiining which mappings are satisfied during a full sync, all source attributes are considered. When determining which mappings are satisfied during a delta sync, only those source attributes that have a changed value (have a pending delta) are considered. When determining which mappings are satisfied during a ref sync, only those source attributes of reference type are considered.

"Export precedence" refers to calculations made to determine if an export flow that overlaps with an import flow will be allowed to execute. The calculation may be made by comparing the precedence of the overlapping import flow with the precedence of the import flow that supplied the values for the core attribute that is the source of the overlapping export flow. Only when the precedence of the source values is higher than that of the overlapping import flow will the export flow be allowed to execute.

In one implementation, an export flow and import flow are said to overlap if the export flow has exactly one source attribute which is also the destination attribute for the import flow and/or the destination attribute of the export flow is one of the source attributes of the import flow.

Referring again to the Generic MA rule configuration, the <provisioning-cleanup> —sub-element may be used to clean the metadirectory buffer and the metadirectory core when objects are disconnected or unlinked. More specifically, the <provisioning-cleanup> element may be used to specify actions to take with respect to a metadirectory buffer object when either (1) a core provisioning script disconnects the buffer object or (2) a core object, to which the buffer object is joined, is deleted. An exemplary, but not necessary, default behavior is to create an explicit disconnector out of the metadirectory buffer object.

The following exemplary <provisioning-cleanup> schema illustrates one possible format for the <provisioning-cleanup> sub-element in XML:

```
<provisioning-cleanup type="declared | scripted">
    <action>
        delete-object |
        make-normal-disconnector |
        make-explicit-disconnector
    </action>
</provisioning-cleanup>
```

Referring again to the MA Generic rule configuration, the <extension> sub-element may be used to identify an assembly to use for evaluation and/or indicate whether to run the extension within a metadirectory server process (application-protection=low) or outside the metadirectory server process (application-protection=high). The <extension> sub-element appears when one or more of the MA Generic rule configuration sub-elements require a .NET® extension DLL, or other assembly, for evaluation. To illustrate, an exemplary <extension> sub-element is shown below:

```
<extension>
    <assembly-name>DLL name (string)</assembly-name>
        <application-protection>high|low</application-protection>
</extension>
```

Referring again to the exemplary MA schema shown above, the controller configuration defines how the MA should be controlled. An exemplary controller configuration schema is given below:

```
<controller-configuration>
    <application-protection>low</application-protection>
    <impersonation>
        <domain>ntdev</domain>
        <user>maxb</user>
        <password>mypassword</password>
    </impersonation>
</controller-configuration>
```

Exemplary element <application-protection> indicates whether the controller should run in a separate process ("high") or in the same process ("low") as the metadirectory service.

Exemplary element <impersonation> is used when the MA controller should impersonate another identity whenever it makes calls into the MA DLL. In an exemplary implementation, the <impersonation> element includes a <domain> sub-element, a <user> sub-elements, and/or a <password> sub-element An exemplary Password Sync Configuration element in the MA Schema indicates whether certain MA procedure calls, such as "set password" and "change password," can be used for the associated MA. An exemplary Password Sync Configuration element includes a schema such as the following:

```
<password-sync-allowed>1|0</password-sync-allowed>
```

In the exemplary schema, a <password-sync-allowed> value of 1 indicates that "set password" and "change password" procedure calls are allowed a <password-sync-allowed> value of 0 indicates that the procedure calls are not allowed.

Exemplary UI Configuration Element

An exemplary MA schema, such as the MA schema described above, includes a <UI Configuration> element having information about the User Interface (UI) configuration for the MS user interface. An exemplary <UI Configuration> includes sub-elements having information that may be used by the UI. The following schema is an exemplary <UI Configuration> schema:

```
<description>My description</description>
<ma-ui-settings>
    <account-joiner-queries>
        ...
    </account-joiner-queries>
</ma-ui-settings>
```

An exemplary <description> includes a text description, such as a user-entered description, containing information about the associated MA. Text in the <description> may be shown on an MA property page of the UI.

An exemplary <ma-ui-settings> element describes MA settings made by a user. Exemplary sub-elements that may be included in the <ma-ui-settings> element include an <attributes> sub-element and a <filters> sub-element.

An exemplary <attributes> sub-element is shown below:

```
<attributes>
<cs>
    <attribute name="DN" header="DN" size="100" />
    <attribute name="objectType" header="objectType" size="100" />
```

-continued
```
    <attribute name="displayname" header="displayname" size="100" />
</cs>
<mv>
<attribute name="displayName" header="displayName" size="100" />
</mv>
</attributes>
```

The exemplary <attributes> sub-element may be used to indicate column numbers associated with metadirectory buffer objects and metadirectory core objects.

An exemplary <filters> sub-element is shown below:

```
<filters max_mv_search_results=" ">
    <filter name="Filter 1"
    collation="SQL_Latin1_General_CP1_CI_AS"
    searchscope="person">
        <element cdattribute="displayname"
    mvattribute="displayName" mvtextflag="true"
    elementoperator="exact" />
    </filter>
</filters>
```

The exemplary <filters> sub-element can be used to indicate one or more filter specifications to be used for searching in the metadirectory for objects that match a selected metadirectory core object.

In one exemplary implementation, the <ma-ui-settings> information is stored with the associated MA (instead of in a file on the local client machine) in order to enable a metadirectory administrator to set up the display columns and filter criteria so they can be used by persons using the account joiner screen.

Exemplary Private Configuration Element

An exemplary <private-configuration> element in the MA schema includes information that is shared between an MA UI and an MA DLL. Information in an exemplary <private-configuration> element is dependent on the type of remote repository that communicates with the MA. Some exemplary schemas are shown below for various exemplary types of remote repositories.

Exemplary LDAP types

AD: An example of AD private configuration
```
        <private-configuration>
            <adma-configuration>
            <forest-guid>...</forest-guid>
            <forest-name>mms-sh1-corp.nttest.microsoft.com</forest-name>
            <forest-login-domain>mms-sh1-corp</forest-login-domain>
            <forest-login-user>administrator</forest-login-user>
            </adma-configuration>
        </private-configuration>
```
AD/AM:
```
        <private-configuration>
            <adma-configuration>
            <forest-name>mms-sh1-corp.nttest.microsoft.com
            </forest-name>
            <forest-port>389</forest-port>
            <forest-login-domain>mms-sh1-corp</forest-login-domain>
            <forest-login-user>administrator</forest-login-user>
            <sign-and-seal>1|0</sign-and-seal>
            <ssl-bind>1|0</ssl-bind>
            </adma-configuration>
        </private-configuration
```
IPLANET:
```
        <private-configuration>
            <ipma-configuration>
```

-continued
```
            <default-server>mms-ip5-bvt</default-server>
            <default-login-user>cn=DirectoryManager</default-login-user>
            <default-port>389</default-port>
            <default-ssl-bind>0</default-ssl-bind>
            <ui-data>
            <session>{107D1AA1-49C6-4AA0-BC59-CC0DAC930311}
            </session>
            <server-type>SERVER_TYPE_IPLANET5</server-type>
            <supportchangelog>1</supportchangelog>
            </ui-data>
            </ipma-configuration>
        </private-configuration>
        <private-configuration>
            <ipma-configuration>
            <default-server>nt4-riplanet</default-server>
            <default-login-user>cn=DirectoryManager</default-login-user>
            <default-port>389</default-port>
            <default-ssl-bind>0</default-ssl-bind>
            <ui-data>
            <session></session>
            <server-type>SERVER_TYPE_IPLANET4</server-type>
            <supportchangelog>1</supportchangelog>
            </ui-data>
            <anchor-attributes>
            <anchor-attribute>
            <name>cn</name>
            <object-type>person</object-type>
            </anchor-attribute>
            </anchor-attributes>
            </ipma-configuration>
        </private-configuration>
```
EXCHANGE 5.5:
```
        <private-configuration>
            <exma-configuration>
            <default-server>default server name for OU,
            schema, and server
            discovery </default-server>
            <default-login-domain>domain</default-login-domain>
            <default-login-user>user</default-login-user>
            </exma-configuration>
        </private-configuration>
```
OTHER Exemplary types SQLOLEDB:
```
        <private-configuration>
            <oledbma-configuration>
            <connection-info>
            <authentication>integrated</authentication>
            <provider>SQLOLEDB</provider>
            <server>....</server>
            <databasename>....</databasename>
            <tablename>....</tablename>
            <delta-tablename>....</delta-tablename>
            </connection-info>
            <mms-info>
            <column-info>
            <column>
            <name>id</name>
            <data-type>DBTYPE_STR</data-type>
            <length>11</length>
            <isnullable>0</isnullable>
            <isreadonly>0</isreadonly>
            <mms-type>String</mms-type>
            </column>
            <column>
            <name>manager</name>
            <data-type>DBTYPE_STR</data-type>
            <length>40</length>
            <isnullable>0</isnullable>
            <isreadonly>0</isreadonly>
            <mms-type dn='1'>String</mms-type>
            </column>
            ...
            </column-info>
            <delta-info>
            <extra-columns> ... </extra-columns>
            <change-column> ... </change-column>
            <add> ... </add>
            <update> ... </update>
```

-continued

```
        <delete> ... </delete>
    </delta-info>
    <anchor>
    <attribute>au__id</attribute>
    </anchor>
    <object-type>person</object-type>
    </mms-info>
    </oledbma-configuration>
    </private-configuration>
ORACLE:
    <private-configuration>
    <oledbma-configuration>
    <connection-info>
    <authentication>integrated</authentication>
    <provider>MSDAORA</provider>
    <datasource>....</datasource>
    <tablename>....</tablename>
    <delta-tablename>....</delta-tablename>
    </connection-info>
    <mms-info>
    <column-info>
    <column>
    <name> id</name>
    <data-type>DBTYPE_STR</data-type>
    <length>11</length>
    <isnullable>0</isnullable>
    <isreadonly>0</isreadonly>
    <mms-type>String</mms-type>
    </column>
    <column>
    <name>manager</name>
    <data-type>DBTYPE_STR</data-type>
    <length>40</length>
    <isnullable>0</isnullable>
    <isreadonly>0</isreadonly>
    <mms-type dn ='1'>String</mms-type>
    </column>
    ...
    </column-info>
    <delta-info>
    <extra-columns> ... </extra-columns>
    <change-column> ... </change-column>
    <add> ... </add>
    <update> ... </update>
    <delete> ... </delete>
    </delta-info>
    <anchor>
    <attribute>au__id</attribute>
    </anchor>
    <object-type>person</object-type>
    </mms-info>
    </oledbma-configuration>
</private-configuration>
```

Exemplary Encrypted Attributes Element

An exemplary Encrypted Attributes Element in an MA schema XML element may be used for two general purposes. First, the UI may use the Encrypted Attributes Element to convey password information from the MA UI to the metadirectory server when creating or updating MA credential information. Second the metadirectory server may use the Encrypted Attributes Element to pass the MA DLL credentials information at the start of a run.

The following exemplary encrypted attributes schema illustrates an exemplary format:

```
<encrypted-attributes>
    <attribute name="foo" partition="bar">value</attribute>
    <attribute name="foo" partition="bar">value</attribute>
    ...
</encrypted-attributes>
```

The meanings of the "name" and "partition" attributes may be MA-specific. Generally, "name" represents the name of an attribute to be encrypted and the partition is the name of the partition with which the attribute is associated.

Exemplary LDAP Types

AD: One <attribute> element with name="password" and no partition attribute is stored to record the credentials information for the forest. Additional partition elements with name="password" and partition=DN of the naming context for each naming context where per-partition credentials information is specified.

AD/AM: One <attribute> element with name="password" and no partition attribute is stored to record the credentials information for the server.

OTHER Exemplary Types

SQLOLEDB and ORACLE: When using SQL or ORACLE security mode, there will be one <attribute> element with name="password" and no partition attribute. This represents the database password of the account sent to the server.

Exemplary Partition Configuration Element

An exemplary Partition Configuration Element describes "partitions" of an associated MA. MAs may consist of one or more partitions, each partition having a specified container/object type filter criteria associated it. To illustrate, an exemplary <ma-partition-data> element is shown below:

```
<ma-partition-data>
    <partition>...</partition>
    <partition>...</partition>
    ...
</ma-partition-data>
```

An exemplary <partition> sub-element is shown below:

```
<partition>
    Naming information
    Versioning information
    Partition details
</partition>
```

Exemplary Partition Naming information describes high-level information about the partition. All sub-elements in this grouping may be specified when the partition is created through DCOM. An exemplary Naming information element is shown below:

```
<id>{3F5AA741-626E-483F-BB2D-EEOF5E73CE02}</id>
<name>DC=africa,DC=mms-sh1-corp,DC=nttest,
DC=microsoft,DC=com</name>
```

Exemplary <id> sub-element is a GUID that uniquely defines the partition in the system. In an exemplary implementation, the <id> is given to the server on all calls involving creation or modification of an MA partition and after a partition is created the id is persistent.

Exemplary <name> sub-element is a non-empty string that the UI displays for the partition. In an exemplary implementation, the UI chooses the name according to the following rules associated with exemplary types of remote repositories:

Exemplary LDAP Types

AD or AD/AM: A partition corresponds to a DNC or NDNC. The name is the DN of the DNC or NDNC in AD.

IPLANET: A partition corresponds to an iPlanet server partition. The name is the DN of the partition on the server.

EXCHANGE 5.5: A partition corresponds to an Exchange "site". The name is the X.500 DN of the OU.

EXCHANGE 5.5. GAL: This MA has one partition named "default."

Exemplary FILE Types

In one implementation, for all file types most users will have only one partition which is named "default," but users can create additional partitions for different object types.

OTHER Exemplary Types

An exemplary MA communicating with another remote repository type not listed above will have one partition named "default."

Exemplary Partition Versioning information

An exemplary Partition Versioning information element in the MA schema includes a grouping of sub-elements that gives versioning information about the partition configuration. In a one particular implementation, the sub-elements in the Partition Versioning information grouping are read-only and may be requested from the server for informational purposes. To illustrate Partition Versioning information, the following exemplary schema is shown:

```
<creation-time>
2002-07-23 17:12:23.699
</creation-time>
<last-modification-time>
2002-07-23 19:21:17.699
</last-modification-time>
<version>5</version>
```

An exemplary <creation-time> sub-element is the time (e.g., in GMT) at which the partition was created on the MMS server.

An exemplary <last-modification-time> sub-element indicates the time (e.g., in GMT) at which the partition configuration was last modified on the metadirectory server.

An exemplary <version> sub-element indicates the version of the partition configuration, wherein higher numbers indicate later versions of the configuration.

Exemplary Partition Details

Exemplary Partition Details element of MA Schema includes sub-elements that specify an actual configuration of the partition. An exemplary schema is shown below to illustrate:

```
<selected>0</selected>
<filter>
    <object-classes>
        <object-class>contact</object-class>
        <object-class>container</object-class>
        <object-class>group</object-class>
        <object-class>user</object-class>
    </object-classes>
    <containers>
        <exclusions/>
        <inclusions>
            <inclusion>DC=africa,DC=mms-sh1-corp,DC=nttest,DC=microsoft,DC=com</inclusion>
        </inclusions>
```

```
    </containers>
</filter>
<custom-data>
...
</custom-data>
```

An exemplary <selected> sub-element is a binary value (1 or 0) indicating whether the partition has been selected by the user in the UI for configuration, and may depend on the type of remote repositories. For example, with regard to AD, AD/AM, IPLANET, Exchange 5.5 directories, the <selected> sub-element corresponds to whether the partition has been "checked" in the UI.

An exemplary <filter> sub-element may be used by the MA to determine which objects to import into the metadirectory buffer. In a particular metadirectory application, MA's are able to filter on both object types and containers (i.e., Distinguished Names). In this particular implementation, two elements are specified in an XML format: "object-classes" (the name is dated and now inaccurate) and "containers."

In an "object-classes" section, object type can be specified. Specified object types are the object types that participate in the synchronization process (i.e., inclusion). In the "containers" section, container types can be specified. Specified container types participated in both inclusion and exclusion processes During filtering, for each DN, the inclusion/exclusion list is searched to find the longest ancestor. If the longest ancestor is included, the DN is included, if the longest ancestor is excluded, our DN is excluded.

With regard to object type and container filtering, the manner of filtering may vary depending on the type of remote repository. Some exemplary types of remote repositories and exemplary associated filtering mechanisms are discussed below:

LDAP Types

AD, AD/AM, IPLANET, Exchange 5.5: Object type inclusion: These MA's support a single object type inclusion filter that applies to all partitions. Even though the object type filter is specified for each partition, a properly configured MA of this type will have the same object type configuration for each of its partitions. Container filtering: Container filtering is per partition. The users can use the container picker to select the desired containers to import form. Under the covers, the MA-specific UI generates inclusion/exclusion rules corresponding to the container picker selections. The logic is perhaps more complicated than expected (except for Exchange 5.5) because of the possibility of child domains. The MA carefully adds in exclusion filter conditions to ensure there is no overlap between parent and child domains.

An exemplary <custom-data> sub-element provides additional information about the partition and is MA-specific. Exemplary XML schemas are shown below that describe <custom-data> sub-elements for exemplary remote repository types.

LDAP Types

AD:

```
<custom-data>
<adma-partition-data>
<dn>DC=africa,DC=mms-sh1-corp,DC=nttest,
DC=microsoft,DC=com</dn>
```

```
        <name>africa.mms-sh1-corp.nttest.microsoft.com</name>
        <guid>{BA84A62C-504E-44B9-9FFE-CF52028B4A36}</guid>
        <is-domain>1</is-domain>
        <sign-and-seal>1</sign-and-seal>
        <preferred-dcs>
            <preferred-dc> ... </preferred-dc>
            <preferred-dc> ... </preferred-dc>
            ...
        </preferred-dcs>
        <dc-failover>1</dc-failover>
    </adma-partition-data>
</custom-data>
```

Exemplary sub-element dn is the distinguished name (DN) of Active Directory® (AD) naming context. Exemplary sub-element name is a NetBIOS® name of the naming context. Exemplary sub-element guid is AD's guid (persistent id) for the naming context. Exemplary sub-element is-domain indicates whether it is a Domain naming context (DNC) or Non-domain Naming Context (NDNC). Exemplary sub-element sign-and-seal indicates whether the user has checked the sign-and-seal option in the UI. Exemplary sub-element preferred-dc provides a list of preferred Domain Controllers (DC) to use when connecting to this naming context in priority order. Exemplary sub-element dc-failover indicates whether the user wants the MA to failover to DCs not specified in the preferred DC list. Exemplary sub-element last-dc represents the last DC used for a run on this partition. Exemplary sub-element cookie represents current watermark from DirSync from last import run. Exemplary sub-element login-domain represents a domain associated with a partition, for which a user has configured specific credentials. Exemplary sub-element login-user then this gives the account associated with a partition, for which a user has configured specific credentials.

```
IPLANET:
    <custom-data>
        <ipma-partition-data>
            <dn>o=bvts</dn>
            <port>389</port>
            <ssl-bind>0</ssl-bind>
                <last-change-number>10315</last-change-number>
        </ipma-partition-data>
    </custom-data>
Exchange 5.5:
    <custom-data>
        <exma-partition-data>
            <dn>partition DN</dn>
            <last-server>server</last-server>
            <preferred-servers>
                <server>preferred server</server>
                ...
            </preferred-servers>
            <available-servers>
                <server>available server</server>
                ...
            </available-servers>
            <server-failover>1 or 0</server-failover>
            <use-ssl>1 or 0</use-ssl>
            <highest-usn>primary watermark value</highest-usn>
            <highest-timestamp>
                secondary watermark value</highest-timestamp>
        </exma-partition-data>
    </custom-data>
```

Exemplary Run Profile Configuration Element

An exemplary Run Profile Configuration Element in an MA schema section describes "run profiles" defined for the MA. The following schema illustrates an exemplary format for a Run Profile Configuration Element:

```
<ma-run-data>
    <run-configuration>...</run-configuration>
    <run-configuration>...</run-configuration>
    ...
</ma-run-data>
```

In a particular metadirectory implementation, the metadirectory server instantiates a MA run by passing a run configuration XML fragment parameter to an Execute() function in the MA. The XML fragment contains execution parameters describing how the MA should run.

An exemplary run configuration schema is shown in the following XML fragment:

```
<ma-run-data>
    <run-configuration>
        <id> guid </id>
        <name> string </name>
        <creation-time> time (read only) </creation-time>
        <last-modification-time> time (read only) </last-modification-time>
        <version> integer </version>
        <configuration>
        <step>
        <step-type type="full-import | delta-import | export | apply-rules">
            <import-subtype> to-file </import-subtype>
            <import-subtype> resume-from-file </import-subtype>
            <import-subtype> to-cs </import-subtype>
            <export-subtype> to-file </export-subtype>
            <export-subtype> resume-from-file </export-subtype>
            <apply-rules-subtype> apply-pending </apply-rules-subtype>
            <apply-rules-subtype> reevaluate-flow-connectors </apply-rules-subtype>
        </step-type>
        <dropfile-name> string </dropfile-name>
        <threshold>
            <object> integer </object>
        </threshold>
        <partition> string </partition>
        <custom-data> XML fragment </custom-data>
        <step>
        <step>
        ...
        </step>
        ...
        </configuration>
    </run-configuration>
    <run-configuration>
        ...
    </run-configuration>
</ma-run-data>
```

Exemplary MA Run Information

Exemplary sub-element <id> is a unique identifier (GUID) associated with the run configuration. Exemplary sub-element <name> is the display name for the run configuration. Exemplary sub-element creation-time is the time (e.g., GMT) at which the run profile was created. Exemplary sub-element last-modification-time is the time (e.g., GMT) when the run profile was last modified. Exemplary sub-element version is the version number (e.g., integer) of the run configuration.

Exemplary sub-element <step> include information about steps and types of steps in the MA run. The user can configure multiple "run profiles" for an MA. Each "run profile" consists of 1 or more steps. Each step may include of an operation involving import, synchronization, or export. Within the <step> sub-element are descriptions associated with one or more types of steps. In the exemplary <step-type> sub-element, possible step-types are "full-import," "delta-import," "export," and "apply rules." Each step-type can be further described in sub-elements for the particular type. Examples of the step-types and their associated values are given in Table 3, Table 4, and Table 5.

Table 3 illustrates exemplary values that may be used in <import-subtype> and <delta-subtype> sub-elements.

TABLE 3

| Import subtype(s) | Description |
|---|---|
| None | An import run without any subtype means that the synchronization is from remote repository all the way to the metadirectory core. |
| to-file | This subtype drops a file during import and stop without staging the import data in metadirectory buffer. With this sub-type, watermark will not be updated for delta import. |
| resume-from-file | This subtype resumes an import run from a drop file. With this sub-type, watermark will not be updated for delta import. |
| to-file, resume-from-file | These subtypes drop an audit file and continue the import run without stopping. |
| to-cs | This subtype stages the import data in metadirectory buffer and stops the import run. |
| resume-from-file, to-cs | These subtypes resume an import run from a drop file, stage the import data in metadirectory buffer and stop the import run. With this sub-type, watermark will not be updated for delta import. |
| to-file, resume-from-file, to-cs | This drops an audit file during import, stages import data in metadirectory buffer and stop the import run. |

Table 4 illustrates exemplary values that may be used in <export-subtype> sub-elements.

TABLE 4

| Import subtype(s) | Description |
|---|---|
| None | An export run without any substep means that the synchronization is from metadirectory buffer all the way to the remote repository. |
| to-file | This will drop a file during export and stop. With this sub-type, export batch number will not be updated. |
| resume-from-file | This will resume an export run from a drop file. With this sub-type, export batch number will not be updated. |
| to-file, resume-from-file | This implies that we will drop an audit file but will not stop at the drop file during an export run. |

Table 5 illustrates exemplary values that may be used in <apply-rules-subtype> sub-elements.

TABLE 5

| Import subtype(s) | Description |
|---|---|
| apply-pending | It attempts to synchronize all connectors with staged pending imports and also attempts to join/project (and flow attributes) on all normal disconnectors even if they have failed to join during previous apply-pending runs. |
| reevaluate-flow-connectors | It attempts to reevaluate attribute flow for all connectors in metadirectory buffer under this MA. |

An exemplary <dropfile-name> sub-element can be provided, whereby the user may specify the name of a drop file associated with the MA run. In a particular implementation, one file name may be provided per step.

An exemplary <threshold> sub-element is a Sync Engine threshold for all MAs. In a particular implementation, all of the specified thresholds are given in absolute numbers. Within a <threshold> sub-element, an <object> sub-element specifies the number of objects to process for the run.

An exemplary <partition> sub-element identifies a partition associated with the associated run steps. In a particular implementation, the format of the partition is MA-specific.

An exemplary <custom-data> sub-element contains MA-specific data for an associated step. Exemplary information that can be provided in the <custom-data> sub-element are step custom data, ad-step-data, time-limit, page-size, batch-size, granular-security, bulk-export, and permissive-write.

To further illustrate an exemplary <ma-run-data> element, the following schema is provided. The schema contains a delta import of objects from an Active Directory® (AD) repository. The delta import data is dropped into a file for audit and then staged in the metadirectory buffer. Then, the run stops so the user can examine the metadirectory buffer to see what will be propagated to the metadirectory core before committing any changes to the core. In this particular example, the drop file path is "C:\temp\test.xml." Also, in this example two thresholds are set and the import run terminates if either one of the thresholds is reached.

```
<ma-run-data>
    <run-configuration>
        <name> My Typical Delta Import </name>
        <id> 934A9523-A3CA-4BC5-ADA0-D6D95D979421 </id>
        <version> 3 </version>
        <configuration>
        <step>
            <step-type type="delta-import">
                <import-subtype> to-file </import-subtype>
                <import-subtype> resume-from-file </import-subtype>
                <import-subtype> to-cs </import-subtype>
            </step-type>
            <dropfile-name> c:\temp\test.xml </dropfile-name>
            <threshold>
                <object> 100 </Object>
                <delete> 20 </Delete>
            </threshold>
            <partition> cn=ssiu1,ou=nttest,dc=Microsoft,dc=com
            </partition>
            <custom-data>
                <timeout>1000</timeout>
                500
            </custom-data>
        <step>
        </configuration>
    </run-configuration>
</ma-run-data>
```

Exemplary Metadirectory Core Schema

An exemplary metadirectory core schema is provided to describe aspects of the metadirectory core at a high-level. As with the exemplary MA schema, elements in the exemplary metadirectory core schema can be broken out into sub-elements. An exemplary metadirectory schema and exemplary sub-elements are described below:

```
<mv-data mms-version="product version (string)">
    <version> integer </version>
    <extension> XML fragment </extension>
    <schema>
        XML fragment
    </schema>
    <import-attribute-flow>
```

```
        XML fragment
    </import-attribute-flow>
    <mv-deletion>
        XML fragment
    </mv-deletion>
    <provisioning type="none | scripted"/>
</mv-data>
```

An exemplary <mv-data> tag contains configuration information for the metadirectory core. An exemplary <version> element contains the version of the metadirectory (e.g., a build number) that exported the XML fragment. If the XML is imported to another metadirectory server, the importing metadirectory will determine whether the importing metadirectory can use the XML fragment by determining whether the importing metadirectory can support this version.

An exemplary <extension> element includes an XML fragment that provides details to how to run an MA extension. An exemplary <extension> element in XML is shown below:

```
<extension>
    <assembly-name>DLL name (string)</assembly-name>
    <application-protection> low | high </application-protection>
    <enable-debugger> true | false </enable-debugger>
    <timeout> integer value </timeout>
</extension>
```

An exemplary <application-protection> element can have two states: high means out-of-proc and low means in-proc. If enable debugger is set to true, a script exception will launch a debugger; otherwise, the exception will be logged and the synchronization will continue.

An exemplary <timeout> tag contains an integer specifying a number of seconds for a timeout. If set to 0, the timeout is disabled. The <timeout> value may be a global setting, in which case, the timeout will be specified only in the Metadirectory Core schema.

An exemplary <schema> element contains a schema associated with the Metadirectory Core. In one implementation, the <schema> is provided in DSML with or without extensions.

An exemplary <import-attribute-flow> element includes rules or script, which govern how attributes on objects in the metadirectory buffer are imported to objects in the metadirectory core. Import attribute flow (IAF) rules describe how attribute values should flow from metadirectory buffer objects to linked metadirectory core objects. They are declared in metadirectory core-centric fashion, so that all import flows for all MAs may be defined in one document.

At the lowest level of exemplary IAF rules is a mapping, which describes how to generate a destination attribute value given a set of source attribute values. At the next level is a flow, which encapsulates the mapping, providing metadata (a unique ID) and criteria by source MA and source buffer object type (primary object class). Flows are then grouped and scoped by destination core attribute and, finally, groups of flows are then grouped into flow sets and defined by destination core object type. Thus, a flow ends up defining a relationship between a single destination core attribute and any number of source buffer attributes from a single object type. More details are given in the sections below.

An exemplary <import-attribute-flow> element specifies import attribute flow (IAF) rules. Within an exemplary <import-attribute-flow> are defined multiple flow sets, which describe the attribute flows or associations for a particular set of metadirectory buffer and metadirectory core object types. An exemplary <import-attribute-flow> element is given below:

```
<import-attribute-flow>
    <import-flow-set mv-object-type="object type">
        <import-flows mv-attribute="attribute name"
            type="ranked">
            <import-flow src-ma="guid" cd-object-type=
            "object type" id="guid">
                <direct-mapping>
                    <src-attribute>attribute name</src-attribute>
                </direct-mapping>
            </import-flow>
            <import-flow src-ma="guid" cd-object-type=
            "object type" id="guid">
                <direct-mapping>
                    <src-attribute intrinsic="true">dn</src-attribute>
                </direct-mapping>
            </import-flow>
            <import-flow src-ma="guid" cd-object-type=
            "object type" id="guid">
                <scripted-mapping>
                    <src-attribute>attribute name</src-attribute>
                    <src-attribute>attribute name</src-attribute>
                    <script-context>context string</script-context>
                </scripted-mapping>
            </import-flow>
            <import-flow src-ma="guid" cd-object-type=
            "object type" id="guid">
                <constant-mapping>
                    <constant-value>value</constant-value>
                </constant-mapping>
            </import-flow>
            <import-flow src-ma="guid" cd-object-type=
            "object type" id="guid">
                <dn-part-mapping>
                    <dn-part>part index</dn-part>
                </dn-part-mapping>
            </import-flow>
            ...
        </import-flows>
        <import-flows mv-attribute="attribute name"
            type="ranked">
            ...
        </import-flows>
        ...
    </import-flow-set>
    <import-flow-set mv-object-type="object type">
        ...
    </import-flow-set>
    ...
</import-attribute-flow>
```

In a particular implementation, IAF mappings describe how to generate a destination metadirectory core attribute value (or values) given a set of source metadirectory buffer attribute values. Four exemplary types of mappings are direct, scripted, constant, and Distinguished Name-part. Each type of mapping has an associated element type: <direct-mapping>, <scripted-mapping>, <constant-mapping>, and <dn-part-mapping>, respectively. Examples of such elements are shown below:

```
<direct-mapping>
    <src-attribute>attribute name</src-attribute>
</direct-mapping>
<direct-mapping>
    <src-attribute intrinsic="true">dn</src-attribute>
</direct-mapping>
<scripted-mapping>
    <src-attribute>attribute name</src-attribute>
```

```
        <src-attribute>attribute name</src-attribute>
        <src-attribute intrinsic="true">dn</src-attribute>
        <script-context>context string</script-context>
    </scripted-mapping>
    <constant-mapping>
        <constant-value>value</constant-value>
    </constant-mapping>
    <dn-part-mapping>
        <dn-part>part index</dn-part>
    </dn-part-mapping>
```

Exemplary flows encapsulate mappings, providing metadata (a unique ID) and scoping by source MA and source buffer object type. Flows are defined via the <import-flow> element, which must have exactly one mapping sub-element. An exemplary <import-flow> elements defines the attributes src-ma, cd-object-type, and id. Below is an example of an <import-flow> element:

```
<import-flow src-ma="guid" cd-object-type="object type" id="guid">
    <direct-mapping>
        <src-attribute>attribute name</src-attribute>
    </direct-mapping>
</import-flow>
```

Within the top-level <import-attribute-flow> element can be multiple <import-flow-set> elements, which themselves can contain multiple <import-flows> elements. The <import-flows> elements can then contain any number of <import-flow> elements. Taken together, the <import-flow-set> and <import-flows> elements define child flow declarations by destination core object type and destination core attribute. Exemplary <import-flow-set> and <import-flows> attribute elements are shown below:

```
<import-flow-set mv-object-type="object type">
    <import-flows mv-attribute=" attribute name"
        type="ranked">
        <import-flow src-ma="guid"
        cd-object-type="object type" id="guid">
        ...
        </import-flow>
        ...
    </import-flows>
    ...
</import-flow-set>
```

An exemplary <mv-deletion-rule> tag specifies how to delete a metadirectory core object of a specified <mv-object-type>. The rule associated with the exemplary <mv-deletion-rule> may be declarative or scripted. If the rule is declarative, then the <mv-deletion-rule> tag contains a child <src-ma> tag that provides the GUID of the MA that has the right to delete the associated metadirectory core object.

If the MA matching this GUID disconnects from a metadirectory core object of the specified type, then the metadirectory core object will be deleted. If the rule is scripted, then no <src-ma> tag will be present. In this case, the synchronization engine (SE) will execute a callout to a metadirectory script object function, which makes a "yes" or "no" decision regarding object deletion. In a particular implementation any number of <mv-deletion-rule types> is allowed, but only one <mv-deletion-rule types> is allowed per <mv-object-class>. An example of a <mv-deletion> schema is shown below:

```
<mv-deletion>
    <mv-deletion-rule mv-object-type="mv object type" id="guid"
        type={"declared" | "scripted"}>
        <src-ma> "MA GUID" </src-ma>
    </mv-deletion-rule>
    <mv-deletion-rule mv-object-type="mv object type" id="guid"
        type={"declared" | "scripted"}>
        ...
    </mv-deletion-rule>
</mv-deletion>
```

An exemplary <provisioning> element is specified to handle object creation and deletion in all remote repositories. The exemplary <provisioning> element includes XML that calls a specified provisioning script. If a tag is missing from the <provisioning> element, or if the "type" attribute is none, no provisioning is specified.

Exemplary Computer and/Computing System

Figure 7:
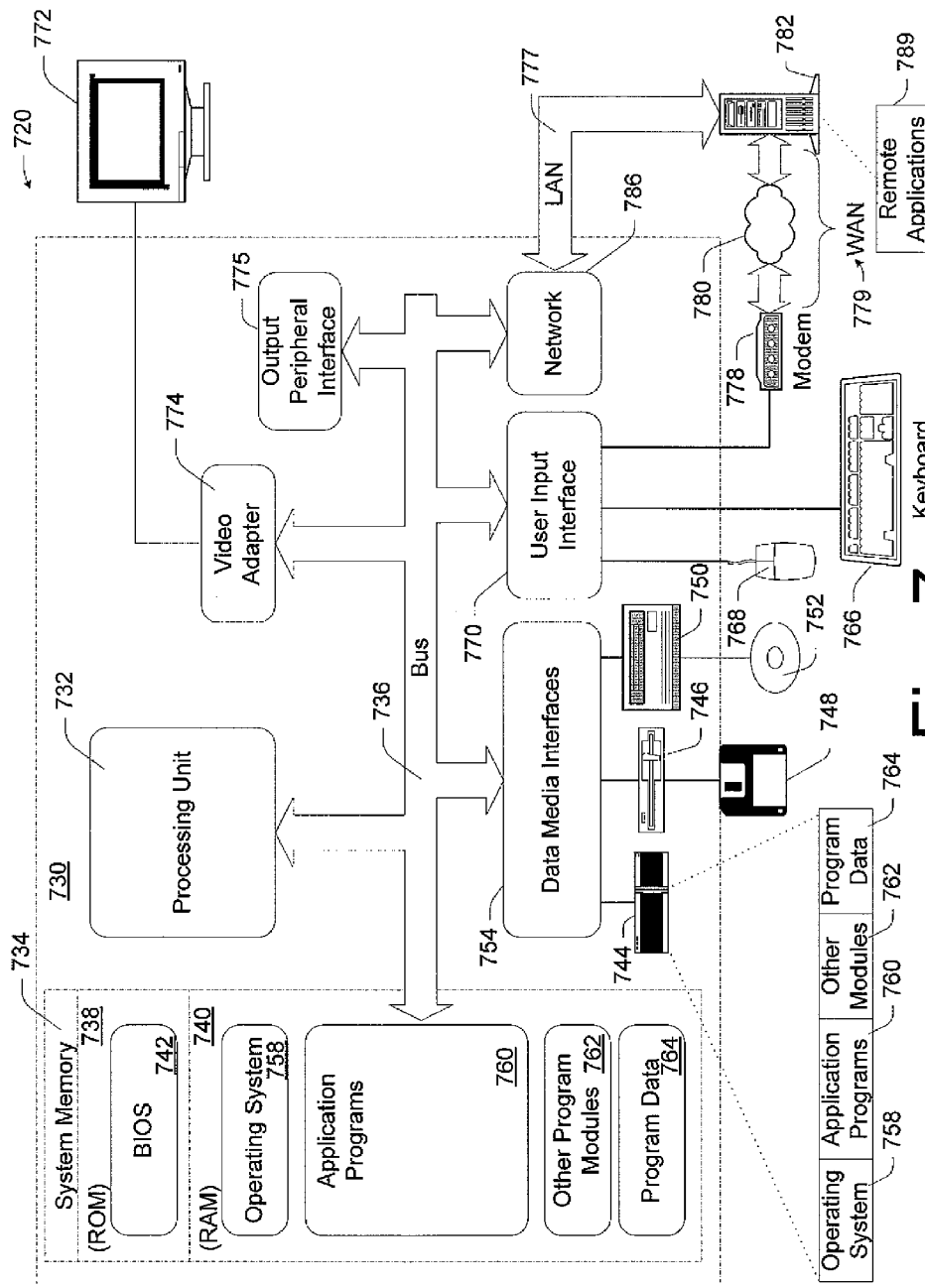
FIG. 7 is a block diagram illustrating an exemplary computer and/or computing environment suitable for use with various methods, units, system, and/or architectures described herein.

FIG. 7 illustrates an example of a suitable computing environment 720 on which the previously described methods and/or storage media may be implemented.

Exemplary computing environment 720 is only one example of a suitable computing environment and is not intended to suggest any limitation as to the scope of use or functionality of the improved methods and arrangements described herein. Neither should computing environment 720 be interpreted as having any dependency or requirement relating to any one or combination of components illustrated in computing environment 720.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 7, computing environment 720 includes a general-purpose computing device in the form of a computer 730. The components of computer 730 may include one or more processors or processing units 732, a system memory 734, and a bus 736 that couples various system components including system memory 734 to processor 732.

Bus 736 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 730 typically includes a variety of computer readable media. Such media may be any available media that is accessible by computer 730, and it includes both volatile and non-volatile media, removable and non-removable media.

In FIG. 7, system memory 734 includes computer readable media in the form of volatile memory, such as random access memory (RAM) 740, and/or non-volatile memory, such as read only memory (ROM) 738. A basic input/output system (BIOS) 742, containing the basic routines that help to transfer information between elements within computer 130, such as during start-up, is stored in ROM 738. RAM 740 typically contains data and/or program modules that are immediately accessible to and/or presently being operated on by processor 732.

Computer 730 may further include other removable/non-removable, volatile/non-volatile computer storage media. For example, FIG. 7 illustrates a hard disk drive 744 for reading from and writing to a non-removable, non-volatile magnetic media(not shown and typically called a "hard drive"), a magnetic disk drive 746 for reading from and writing to a removable, non-volatile magnetic disk 748 (e.g., a "floppy disk"), and an optical disk drive 750 for reading from or writing to a removable, non-volatile optical disk 752 such as a CD-ROM, CD-R, CD-RW, DVD-ROM, DVD-RAM or other optical media. Hard disk drive 744, magnetic disk drive 746 and optical disk drive 750 are each connected to bus 736 by one or more interfaces 754. The computer storage media include non-volatile magnetic disk (e.g., a "floppy disk"), an optical disk, volatile memory, such as random access memory (RAM), and/or non-volatile memory, such as read only memory (ROM).

The drives and associated computer-readable media provide nonvolatile storage of computer readable instructions, data structures, program modules, and other data for computer 730. Although the exemplary environment described herein employs a hard disk, a removable magnetic disk 748 and a removable optical disk 752, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment. Of course, the exemplary computing environment 720 may include an interface for one or more storage devices accessible via a standard or non-standard connection according to IEEE 1394, universal serial bus (USB), SCSI, fibrechannel, etc.

A number of program modules may be stored on the hard disk, magnetic disk 748, optical disk 752, ROM 738, or RAM 740, including, e.g., an operating system 758, one or more application programs 760, other program modules 762, and program data 764.

The improved methods and arrangements described herein may be implemented within operating system 758, one or more application programs 760, other program modules 762, and/or program data 764.

A user may provide commands and information into computer 730 through input devices such as keyboard 766 and pointing device 768 (such as a "mouse"). Other input devices (not shown) may include a microphone, joystick, game pad, satellite dish, serial port, scanner, camera, etc. These and other input devices are connected to the processing unit 732 through a user input interface 770 that is coupled to bus 736, but may be connected by other interface and bus structures, such as a parallel port, game port, or a universal serial bus (USB).

A monitor 772 or other type of display device is also connected to bus 736 via an interface, such as a video adapter 774. In addition to monitor 772, personal computers typically include other peripheral output devices (not shown), such as speakers and printers, which may be connected through output peripheral interface 775.

Logical connections shown in FIG. 7 are a local area network (LAN) 777 and a general wide area network (WAN) 779. Such networking environments are commonplace in offices, enterprise-wide computer networks, intranets, and the Internet.

When used in a LAN networking environment, computer 730 is connected to LAN 777 via network interface or adapter 786. When used in a WAN networking environment, the computer typically includes a modem 778 or other means for establishing communications over WAN 779. Modem 778, which may be internal or external, may be connected to system bus 736 via the user input interface 770 or other appropriate mechanism. Of course, the environment 720 may include extensive network switching and/or routing capabilities, including but not limited to security (firewall) functionality, virtual private network (VPN), QOS, etc.

Depicted in FIG. 7, is a specific implementation of a WAN via the Internet. Here, computer 730 employs modem 778 to establish communications with at least one remote computer 782 via the Internet 780.

In a networked environment, program modules depicted relative to computer 730, or portions thereof, may be stored in a remote memory storage device. Thus, e.g., as depicted in FIG. 7, remote application programs 789 may reside on a memory device of remote computer 782. It will be appreciated that the network connections shown and described are exemplary and other means of establishing a communications link between the computers may be used.

Although some exemplary methods, exemplary devices, exemplary systems, and exemplary schemas have been illustrated in the accompanying Drawings and described in the foregoing Detailed Description, it will be understood that the methods, devices, systems, and schemas are not limited to the exemplary embodiments disclosed, but are capable of numerous rearrangements, modifications and substitutions without departing from the spirit set forth and defined by the following claims.

What is claimed is:

1. A computer-readable storage media comprising computer-executable instructions for a Management Agent ("MA") containing a MA schema that, when executed by one or more processors, cause instructions for the MA containing the MA schema to perform the following:

modeling, by the MA schema, a structure of information processed by a metadirectory server, wherein the metadirectory server contains a metadirectory buffer and a metadirectory core, and communicating with one or more remote data repositories by the management agent containing the MA schema, wherein the communicating with the one or more remote data repositories by the MA containing the MA schema comprises receiving data objects in the metadirectory server, staging the data objects in the metadirectory buffer, and transferring the data objects in the metadirectory server out to a particular one of the one or more remote data repositories, the MA schema comprising:

a naming information element to represent a name of the MA schema; a versioning information element to represent a version of the MA schema, wherein higher values of the versioning information element are to indicate later versions of a MA configuration;

a generic MA rule configuration element to represent a configuration of MA rules of the MA schema, wherein the generic MA rule configuration element comprises:

a connector-filter element to represent a condition to determine whether an object will be imported into the metadirectory core during synchronization;

a join element to represent linkage between an object in the metadirectory buffer and an object in the metadirectory core;

a projection element to represent projection of an object in the metadirectory buffer into the metadirectory core;

an export-attribute-flow element to represent flow of an object in the metadirectory core to the metadirectory buffer; and a provisioning-cleanup element to represent a rule to execute upon deletion of an object from the metadirectory core;

a controller configuration element to represent a user controlling the MA schema;

a password sync configuration element to represent when a password of the MA schema can be set and changed by the user;

a User Interface (UI) configuration element to represent information used by a UI of the MA schema;

a private configuration element to represent settings specific to a type of remote data repository of the one or more remote data repositories identified in the private configuration element of the MA schema;

an encrypted attribute configuration element to represent encrypted information of the MA schema, at least a part of the encrypted information being the structure of information processed by the metadirectory server; and a partition configuration element to represent a mapping between one or more input objects of the MA schema and a partition of the MA schema, each partition is to have a specified container/object type filter criteria associated with the partition to filter the one or more input objects.

2. The computer-readable storage media of claim 1, wherein the naming information element comprises:

an id element to represent a unique identifier of the MA schema;

a name element to represent a display name of the MA schema; and a category element to represent a type of MA schema.

3. The computer-readable storage media of claim 1, wherein the versioning information element comprises:

a creation-time element to represent a time at which the MA schema was created;

a last-modification-time element to represent a time at which the MA schema was last modified; and a version element to represent the version of the MA schema.

4. The computer-readable storage media of claim 1, wherein the connector-filter element comprises at least one filter-set element to represent filtering conditions for a remote repository object type, the at least one filter- set elements comprising:

a cd-object-type attribute to represent a specific remote repository object type to be filtered by the filter-set;

a type attribute to represent whether the filter-set element contains a declared filter or scripted filter; and at least one filter-alternative element comprising at least one condition element, the at least one condition element comprising:

a cd-attribute attribute to represent a target attribute on which to apply the condition element;

an operator attribute to represent an operator applied to the target attribute by the application of the condition element; and at least one value element to represent an object of comparison.

5. The computer-readable storage media of claim 1, wherein the join element to represent linkage between an object in a metadirectory buffer and an object in the metadirectory core comprises at least one join-profile element, the at least one join-profile element comprising:

a cd-object-type attribute to represent an object type to which the join-profile element applies; and at least one join-criterion element to represent a search criteria and a method of join resolution.

6. The computer-readable storage media of claim 5, wherein the at least one join-criterion element comprises:

a collation-order element to represent how database string comparisons are to be performed; and at least one search element, the at least one search element comprising at least one condition element applied to a metadirectory core object being searched for.

7. The computer-readable storage media of claim 1, wherein the projection element comprises at least one class-mapping element, the at least one class-mapping element comprising:

a type attribute to represent whether a mapping is declared in the MA schema, is defined in a script, or is not defined; and a cd-object-type attribute to represent the attribute type being mapped.

8. The computer-readable storage media of claim 1, wherein the export-attribute-flow (EAF) element comprises:

at least one export-flow-set element, the at least one export-flow-set element comprising a cd-object-type attribute to represent a schema of a destination MA and an mv-object-type element to represent an object type defined in a core schema of the metadirectory core.

9. The computer-readable storage media of claim 1, wherein the rule to execute upon deletion of an object from the metadirectory core creates an explicit disconnector object.

10. The computer-readable storage media of claim 1, wherein the encrypted attribute configuration element is further to either:

convey password information from a MA user interface to the metadirectory server when creating or updating MA credential information; or pass one or more MA dynamic link library credential information at the start of a run.

11. The computer-readable storage media of claim 3, wherein the version element is further to identify and prevent simultaneous modification of the MA schema by more than one user by comparing a previous MA version number prior to an edit with the current MA version number in the metadirectory server and to cause the modification of the MA schema to fail if the previous MA version number is less than the current MA version number.

* * * * *